United States Patent [19]
Cochrane et al.

[11] Patent Number: 5,963,934
[45] Date of Patent: Oct. 5, 1999

[54] INTELLIGENT COMPILATION OF SCRIPTING LANGUAGE FOR QUERY PROCESSING SYSTEMS

[75] Inventors: Roberta Jo Cochrane, Los Gatos; Mir Hamid Pirahesh, San Jose, both of Calif.; Serge Philippe Rielaü, Kaiserslaütern, Germany; Richard Sefton Sidle, Toronto, Canada

[73] Assignee: International Business Machines Corporation, Armonk, N.Y.

[21] Appl. No.: 08/884,820

[22] Filed: Jun. 30, 1997

[51] Int. Cl.[6] .................................................. G06F 17/30
[52] U.S. Cl. ........................................... 707/2; 707/3
[58] Field of Search .................................. 707/1, 2, 3, 4, 707/5, 6, 100, 101, 102

[56] References Cited

U.S. PATENT DOCUMENTS

| | | | |
|---|---|---|---|
| 4,947,320 | 8/1990 | Crus et al. | 364/200 |
| 5,133,068 | 7/1992 | Crus et al. | 395/600 |
| 5,546,576 | 8/1996 | Cochrane et al. | 395/600 |
| 5,548,755 | 8/1996 | Leung et al. | 395/600 |
| 5,659,725 | 8/1997 | Levy et al. | 395/600 |
| 5,706,494 | 1/1998 | Cochrane et al. | 395/602 |
| 5,761,493 | 6/1998 | Blakeley et al. | 395/604 |
| 5,778,355 | 7/1998 | Boyer et al. | 707/2 |
| 5,812,996 | 9/1998 | Rubin et al. | 707/2 |
| 5,826,077 | 10/1998 | Blakeley et al. | 395/604 |
| 5,826,253 | 10/1998 | Bredenberg | 707/2 |

OTHER PUBLICATIONS

Roberta Cochrane et al., "Integrating Triggers and Declarative Constraints in SQL Database Systems", Proceedings of the 22nd VLDB Conference, Mumbai (Bombay), India, 1996.

Pirahesh et al., "Extensible/Rule Based Query Rewrite Optimization in Starburst", Proc. ACM SIGMOD International Conference on Management of Data, San Diego, California, Jun., 1992.

*Primary Examiner*—Paul V. Kulik
*Assistant Examiner*—Michael J. Wallace, Jr.
*Attorney, Agent, or Firm*—Merchant & Gould

[57] ABSTRACT

A method, apparatus, and article of manufacture for an intelligent compiler. A query is executed in a computer to retrieve data from a relational database stored on a data storage device. One or more scripting language statements are compiled to generate an internal representation. Then, the execution of the scripting language statements is optimized using the generated internal representation.

42 Claims, 17 Drawing Sheets

5,963,934

INTELLIGENT COMPILATION OF SCRIPTING LANGUAGE FOR QUERY PROCESSING SYSTEMS

CROSS-REFERENCE TO RELATED APPLICATIONS

This application is related to the following co-pending and commonly-assigned patent applications:

U.S. application Ser. No. 08/884,998, entitled "INTELLIGENT COMPILATION OF PROCEDURAL FUNCTIONS FOR QUERY PROCESSING SYSTEMS," filed Jun. 30, 1997, by Roberta Jo Cochrane et al., attorney's docket number ST9-97-072;

U.S. application Ser. No. 08/885,479, entitled "SHARED NOTHING PARALLEL EXECUTION OF SQL ACTIONS THAT MUST BE SYNCHRONIZED," filed Jun. 30, 1997, by Roberta Jo Cochrane et al., attorney's docket number AM9-97-048;

U.S. application Ser. No. 08/884,832, entitled "SYNCHRONIZATION OF SQL ACTIONS IN A RELATIONAL DATABASE SYSTEM," filed Jun. 30, 1997, by Roberta Jo Cochrane et al., attorney's docket number AM9-97-051; and all of which applications are incorporated by reference herein.

BACKGROUND OF THE INVENTION

1. Field of the Invention.

This invention relates in general to database query processing systems performed by computers, and in particular, to the intelligent compilation of scripting language statements.

2. Description of Related Art.

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

The SQL interface incorporates into its language SQL-Bodied functions. A SQL-bodied function is a procedure written by a user in SQL, which can then be used in queries. During compilation of a query, the compiler optimizes the execution of the query. However, the compiler typically ignores SQL-bodied functions. Therefore, the execution of SQL-bodied functions is not optimized in the context of the referencing query. There is a need in the art for improved compilation and execution of SQL-bodied functions within the context of their referencing query.

Additionally, as RDBMS software has evolved, SQL has been enhanced to include the SQL scripting language. The SQL scripting language specifies the syntax and semantics of a database language for declaring and maintaining persistent database language routines either in SQL-server modules or as standalone schema-level routines, and invoking them from programs written in a standard programming language. In conventional systems, special interpreters have been used in conjunction with traditional compilers to parse the SQL scripting language. This requires two passes, one with the traditional compiler and another with the special interpreter, to parse the language. There is a need in the art for improved compilation of SQL scripting language.

SUMMARY OF THE INVENTION

To overcome the limitations in the prior art described above, and to overcome other limitations that will become apparent upon reading and understanding the present specification, the present invention discloses a method, apparatus, and article of manufacture for an intelligent compiler.

According to the present invention, a query is executed in a computer to retrieve data from a relational database stored on a data storage device. One or more scripting language statements are compiled to generate an internal representation. Then, the execution of the scripting language statements is optimized using the generated internal representation.

An object of the present invention is to provide optimized execution of SQL scripting language statements. Another object of this invention is to compile SQL scripting language statements to generate internal representations that are used in optimizing the execution of the query.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention encapsulates reusable functions and simplifies queries. The present invention is applicable to procedural functions and SQL scripting language (i.e., persistent stored modules) described in *ISO Working Draft: Database Language SQL,* April 1997, which is incorporated by reference herein. Additionally, the present invention is able to perform conflict checks for READ/WRITE operations. For example, when a view is used for two operations, the present invention can intelligently determine whether a copy of the view is needed and when it can be shared. The present invention is able to operate on complex data types without moving the processing out of the compiler. The present invention simplifies parameterized recursion by providing one query with parameters that can be changed.

The present invention specifically addresses simple sequencing of statements, the definition and use of local variables, and iteration. Unlike conventional systems, the present invention also is able to return tables, even while processing a case statement. Moreover, under the present invention, every selection for a CASE statement can be processed. The present invention is also directed to shallow and deep correlation and to splitting of common subexpressions. The present invention also handles statements that direct the flow of control, including RETURN and EXIT statements. Moreover, the present invention is able to assign the result of an expression to a variable or a parameter.

Hardware Environment

An intelligent compiler component 100 is described with reference to FIG. 1. A preferred embodiment has an implementation of the intelligent compiler component 100 that runs as part of the parser 102.

Figure 1:
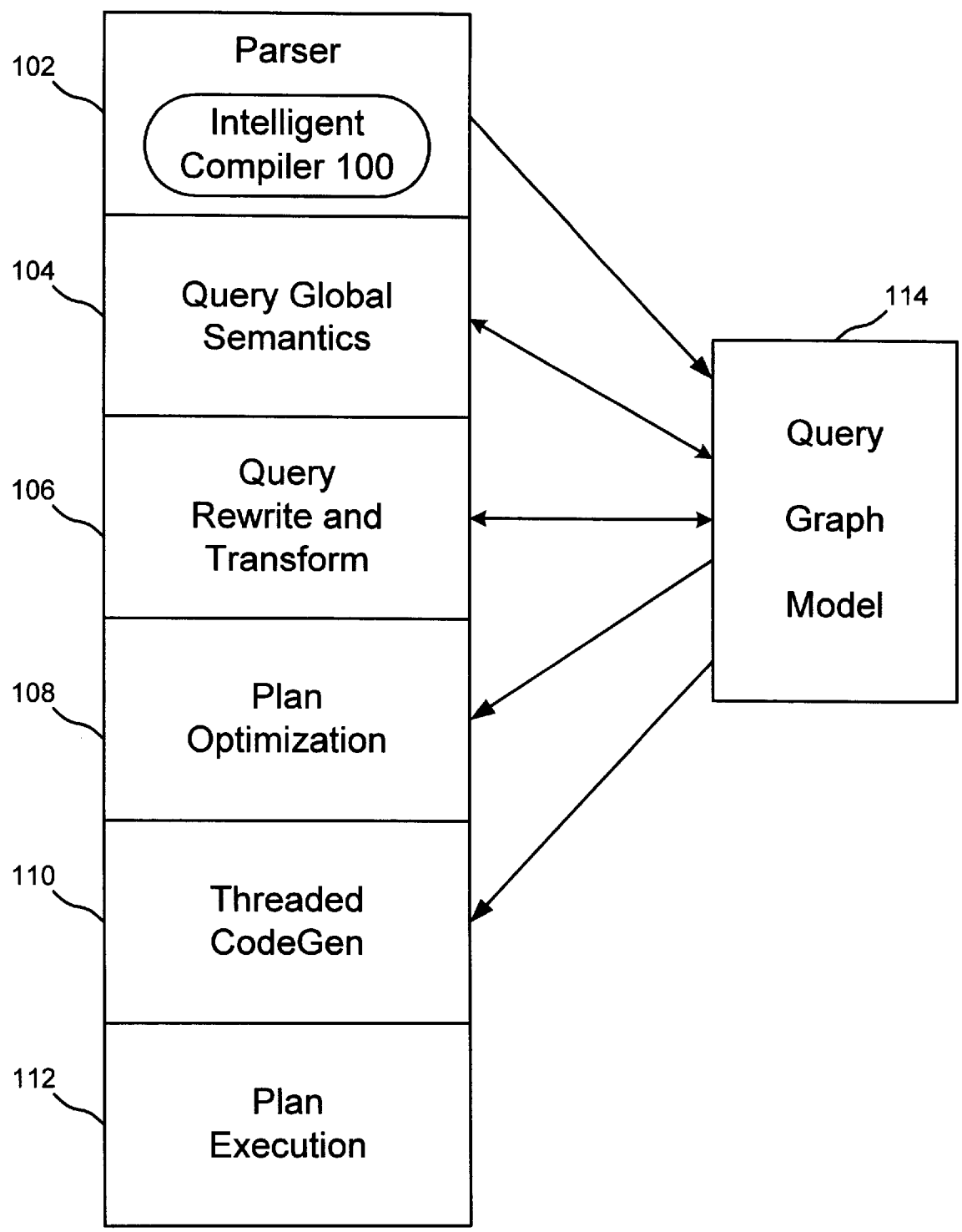
FIG. 1 is a block diagram illustrating the framework for the implementation that supports the integration of the intelligent compiler component with the parser.

FIG. 1 is a block diagram illustrating the framework for the implementation that supports the integration of the intelligent compiler component 100 with the parser 102. One skilled in the art would recognize that the intelligent compiler component 100 could be integrated with a different component, for example, with the query global semantics component 104, or its functionality could be provided across multiple components.

A query is received by the parser 102. The query contains SQL-bodied functions (i.e., procedural functions written in SQL) and SQL scripting language statements that conventional parsers typically ignore. The parser 102 parses the query, with the intelligent compiler component 100 parsing the SQL-bodied functions and SQL scripting language statements. The parser 102 works in conjunction with the intelligent compiler component 100 to generate an internal representation of the query called a query graph, i.e. a data structure query graph model 114. One skilled in the art would recognize that a query graph is only one internal representation of a query and that other internal representations could also be generated.

The query graph model 114 is passed to the query global semantics component 104. The query global semantics component 104 may modify the query graph model 114 to incorporate constraint checking, referential integrity checking, and triggers processing into the query, which are more fully described in U.S. Pat. No. 5,133,068 for "Compiled Objective Referential Constraints in a Relational Database Having Dual Chain Relationship Descriptors Linked in Data Record Tables," issued to Crus et al. on Jul. 21, 1996; U.S. Pat. No. 4,947,320 for "Method for Referential Constraint Enforcement in a Database Management System," issued to Crus et al., on Aug. 7 1990; and R. Cochrane, H. Pirahesh, and M. Nelson, Integrating Triggers and Declarative Constraints in SQL Database Systems, Proceedings of the 22nd VLDB Conference, Bombay, India, 1996, all of which are incorporated by reference herein.

The query graph model 114 is then passed to the query rewrite and transform component 106, which employs relational query rewrite and transform techniques that were developed for relational systems. The query rewrite and transform component 106 has as its result a query graph model 114 that is used by the plan optimization component 108. The plan optimization component 108 further optimizes the query and generates a query plan. The threaded codegen component 110 receives the query graph model 114 and the query plan and generates an optimal execution plan. The plan execution component 112 receives and executes the optimal execution plan.

Figure 2:
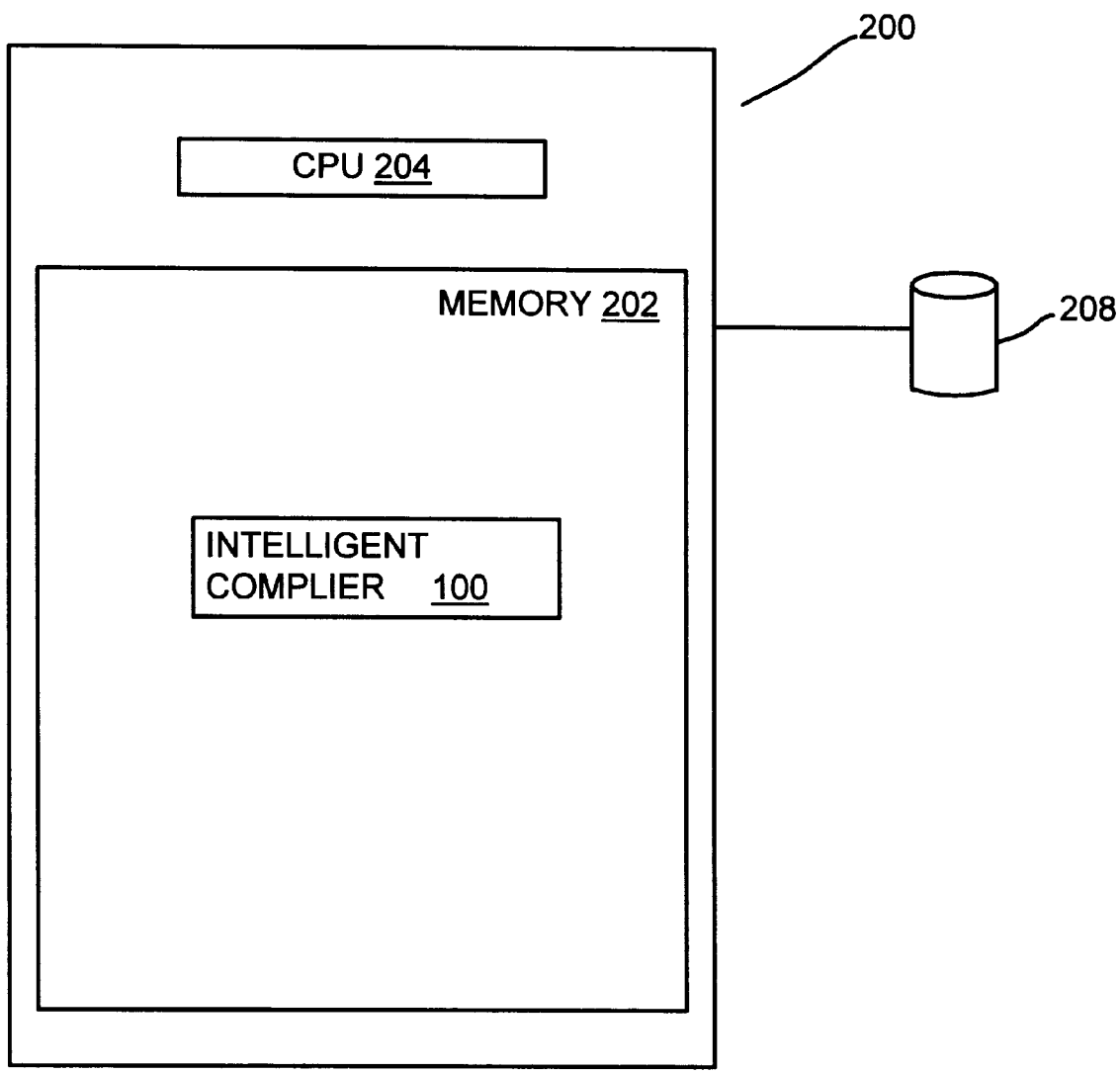
FIG. 2 is a block diagram illustrating the context of the intelligent compiler component in an exemplary hardware environment used to implement the preferred embodiment of the present invention.

FIG. 2 is a block diagram illustrating the context of the intelligent compiler component 100 in an exemplary hardware environment used to implement the preferred embodiment of the present invention. The computer system 200 has a memory 202 and at least one central processing unit 204. The memory contains an intelligent compiler component 100. In the exemplary hardware environment, the computer may also include, inter alia, a keyboard, or display, and may be connected locally or remotely to fixed and/or removable data storage devices 208 and/or data communications devices. The data storage device 208 may store a relational database. The computer 200 could be connected to other computer systems via the data communications devices. Those skilled in the art will recognize that any combination of the above components, or any number of different components, peripherals, and other devices, may be used with the computer 200. Those skilled in the art will also recognize that the present invention may be implemented on multiple computers networked together, rather than on a single computer.

The present invention is typically implemented using one or more computer programs, each of which executes under the control of an operating system, such as OS/2®, Windows®, AIX®, UNIX®, or MVS®, and causes the computer 200 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the computer 200, cause the computer 200 to perform the steps necessary to implement and/or use the present invention. Under control of the operating system, the computer programs may be loaded from the memory, data storage devices, and/or data communications devices into the memories of the computer 200 for use during actual operations. Those skilled in the art will recognize many modifications may be made to this configuration without departing from the scope of the present invention.

Intelligent Compilation of SQL-Bodied Functions

The present invention enables the compilation and optimization of SQL-bodied functions in the context of their containing queries. Referring back to FIG. 1, the intelligent compiler component 100, in conjunction with the parser 102, parses the query containing the SQL-bodied function. The intelligent compiler component 100 modifies the query graph model 114 that a traditional parser 102 generates. The intelligent compiler component provides the "glue" that modifies the query graph model to reflect the parsing of SQL-bodied functions. The modified query graph model 114 is then ready to be used by the query global semantics component 104, the query rewrite and transform component 106, the plan optimization component 108, and the threaded codegen component 110 to generate an optimal execution plan, without the need for modifying any of these components. The intelligent compiler component 100 enables optimal execution of SQL-bodied functions within the context of queries.

For example, the following functions fooS and fooT are sample SQL-bodied functions written in pseudocode:

CREATE FUNCTION fooS ($arg_1$ INT, $arg_2$ VARCHAR (20))
RETURNS INT LANGUAGE SQL READS SQL DATA
RETURN $arg_1$+(SELECT $c_1$ FROM $T_1$ WHERE $arg_2=c_2$);

The function fooS has two arguments, $arg_1$, which is an integer, and $arg_2$, which is a variable length character string having up to twenty (20) characters. The function fooS returns an integer, it is written in SQL, and it reads SQL data. The function foos returns an integer generated from the formula: $arg_1$+(SELECT $c_1$ FROM $T_1$ WHERE $arg_2$=c2).

CREATE FUNCTION fooT ($arg_1$ VARCHAR (20)) RETURNS
TABLE ($c_1$ FLOAT, $c_2$ INT) LANGUAGE SQL READS SQL
DATA RETURN SELECT $b_1$* LENGTH(arg1), $b_2$ FROM $T_2$
WHERE $arg_1=b_3$;

The function fooT has an argument $arg_1$, which is a variable length character string having up to twenty (20) characters. The function fooT returns a table having two columns, $c_1$, which contains floating-point numbers, and $c_2$, which contains integers. The function fooT is written in SQL and reads SQL data. The function fooT returns data based on the query: SELECT $b_1$* LENGTH(arg1), $b_2$ FROM $T_2$ WHERE $arg_1=b_3$.

The SQL-bodied functions can be used in a query, such as the following:

SELECT $c_1$ FROM TABLE (fooT('hello') AS T WHERE fooS($c_2$, 'world')>$c_1$

Conventional compilers ignore the references to functions fooT and fooS. Then, these conventional compilers parse the query, without parsing the SQL-bodied functions. As the conventional systems parse the query, they are able to optimize the execution of the query. By ignoring the SQL-bodied functions during parsing, the conventional systems fail to optimize execution of the SQL-bodied functions within the context of the query.

On the other hand, the intelligent compiler component 100 performs parsing of the SQL-bodied function while parsing a query. Therefore, the intelligent compiler component 100 provides the query global semantics component 104, the query rewrite and transform component 106, and the plan optimization component 108 with a query graph model that reflects the parsing of the SQL-bodied function. Then, the plan optimization component 108 is able to generate an optimal execution plan that executes the query containing the SQL-bodied function in an optimal manner.

The following function is another sample SQL-bodied function written in pseudocode:

CREATE FUNCTION Foo ($arg_1$ $t_1$,,$arg_n$ $t_n$) RETURNS $t_{n+1}$ or
TABLE LANGUAGE SQL RETURN body ($arg_1$,,$arg_n$);

The function Foo has as its arguments types, $t_1$ and $t_n$, and the function Foo returns a type for a scalar value (i.e., $t_{n+1}$) or a type for a table. The results of the function Foo are determined during execution using body ($arg_1$,,$arg_n$). The function Foo is written in SQL, which indicates it is to be compiled by a SQL compiler.

If the function returns a scalar value, the function may be used in a query such as the following:

SELECT Foo (Employee. $a_1$,,Employee.$a_n$) FROM EMPLOYEE

The SELECT statement returns a type for a scalar value. However, one skilled in the art would recognize that if the SQL-bodied function returned a different type, such as a table type, the function could be used in a query to return that type.

The intelligent compiler component 100 translates the above SELECT statement into the following compiled SQL form:

SELECT T.$c_1$ FROM EMPLOYEE SELECT body($arg_1$,,$arg_n$)
FROM (SELECT Employee.$a_1$ AS $arg_1$,,Employee.$a_n$ AS $arg_n$
FROM VALUES (1));

The compiled SQL is an internal representation of the query. The query may be represented using other internal representations, such as a query graph model. Although the example above shows the compiled SQL form of a query containing a SQL-bodied function that returns a scalar type, one skilled in the art will recognize that the compiled SQL form may be used for queries containing SQL-bodied functions that return other types, for example, table types.

Figure 3:
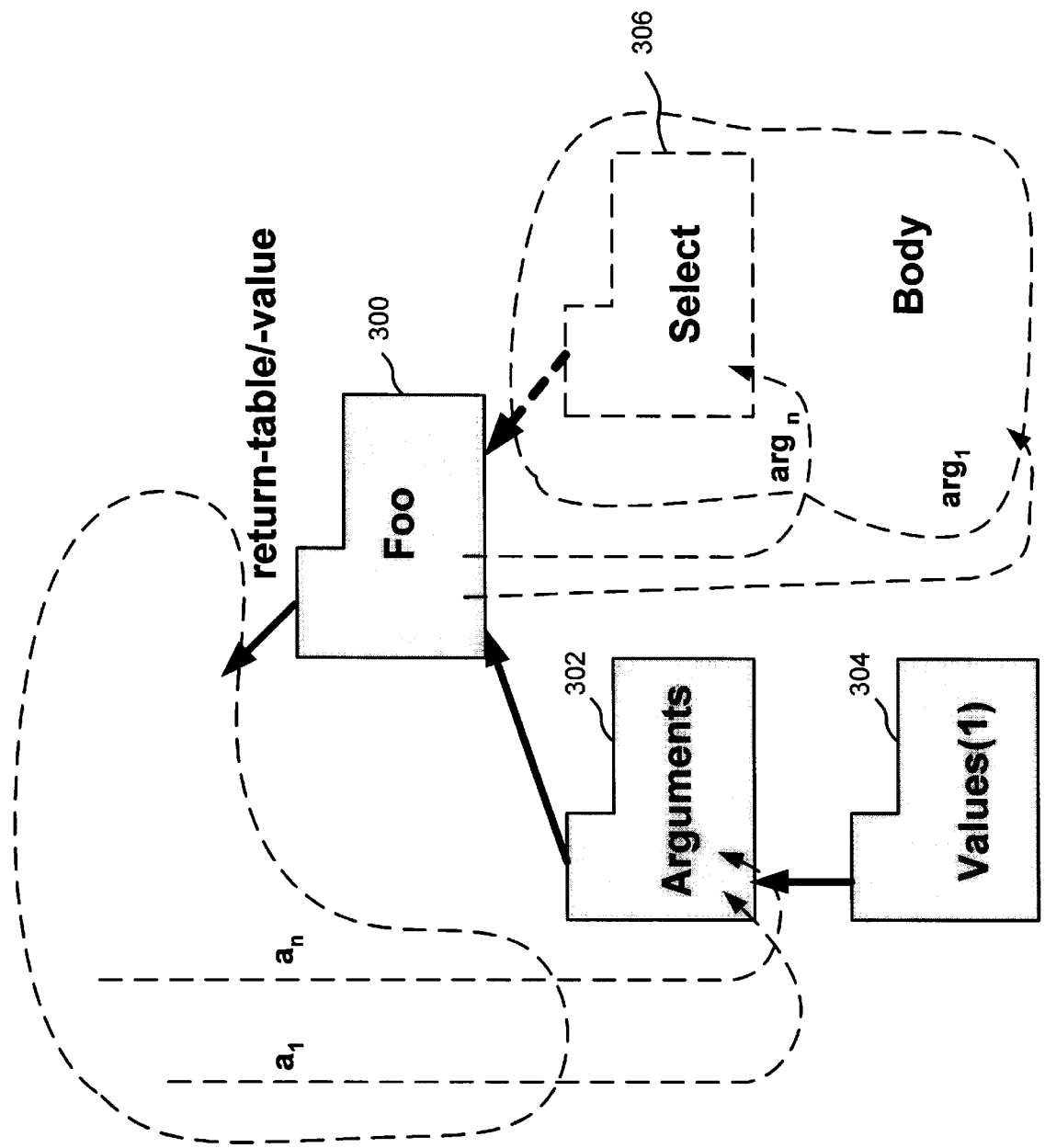
FIG. 3 illustrates a query graph model generated by the intelligent compiler component that corresponds to a compiled SQL statement for a query containing a SQL-bodied function.

FIG. 3 illustrates a query graph model generated by the intelligent compiler component 100 that corresponds to the compiled SQL statement for the query containing a SQL-bodied function. The use of query graph models reduces the complexity of query compilation and optimization procedures. Query graph models also facilitate rewriting of queries in an efficient manner.

A query graph model represents subquery operations, such as SELECT, in "boxes." The interconnections ("arcs"

or "edges") between the boxes define the relationships between different items of data from different subquery operations. Query graph models are well known in the art and are described in more detail in: Pirahesh et al., "Extensible/Rule Based Query Rewrite Optimization in Starburst," *Proceedings of ACM SIGMOD '92 International Conference on Management of Data,* San Diego, Calif., U.S.A., 1992, and which is incorporated by reference herein. In the following discussions of query graph models, different "boxes" will be labeled to identify their functionality, but each of these boxes is a SELECT box. For example, the following labels may be placed on SELECT boxes: Sequence, TopSeq, BodySeq, labelSequ, VarTable, TopVarTbl, ArgTable, Loop, Iterator, Return, Case, or Foo.

The query graph model supports arbitrary table operations where the inputs are tables and the outputs are tables. When a query is represented by a query graph model, each operation of the query may be graphically represented by a box having a head and body. For each box, the head of the box describes the output data stream or table produced by the operation, and the body specifies the operation required to compute the output table from records flowing into the body. The head of the box specifies each output column, and includes column names, types, and output ordering information. The body of the box may include "quantifiers," comprising table references or derived tables. Quantifiers have several types, including type "E" (Existential) quantifiers that correspond to the subquery associated with SQL's predicates EXISTS, IN ANY, and SOME.

As illustrated in FIG. 3, the Foo box 300 processes the function Foo using as its inputs data from the Arguments box 302 and the Select box 306. The Arguments $a_1$ and $a_n$ are supplied as inputs to the arguments box 302. The Values box 304 is a placeholder that provides a single data item. In FIG. 3, the Values box 304 provides a single value to the Arguments box 302. The Arguments box 302 in turn supplies the Arguments $a_1$ and $a_n$ and the value to the Foo box 300. The Select box 306 receives arguments $a_1$ and $a_n$, which are passed as $arg_1$ and $arg_n$, from the Foo box 300. When arguments are passed in this manner, they are said to be correlated. The body of the Select box 306 performs a SELECT operation and returns its result to the Foo box 300. Upon receiving data from the Arguments box 302 and the Select box 306, the Foo box 300 returns the table $t_{n+1}$.

Figure 4:
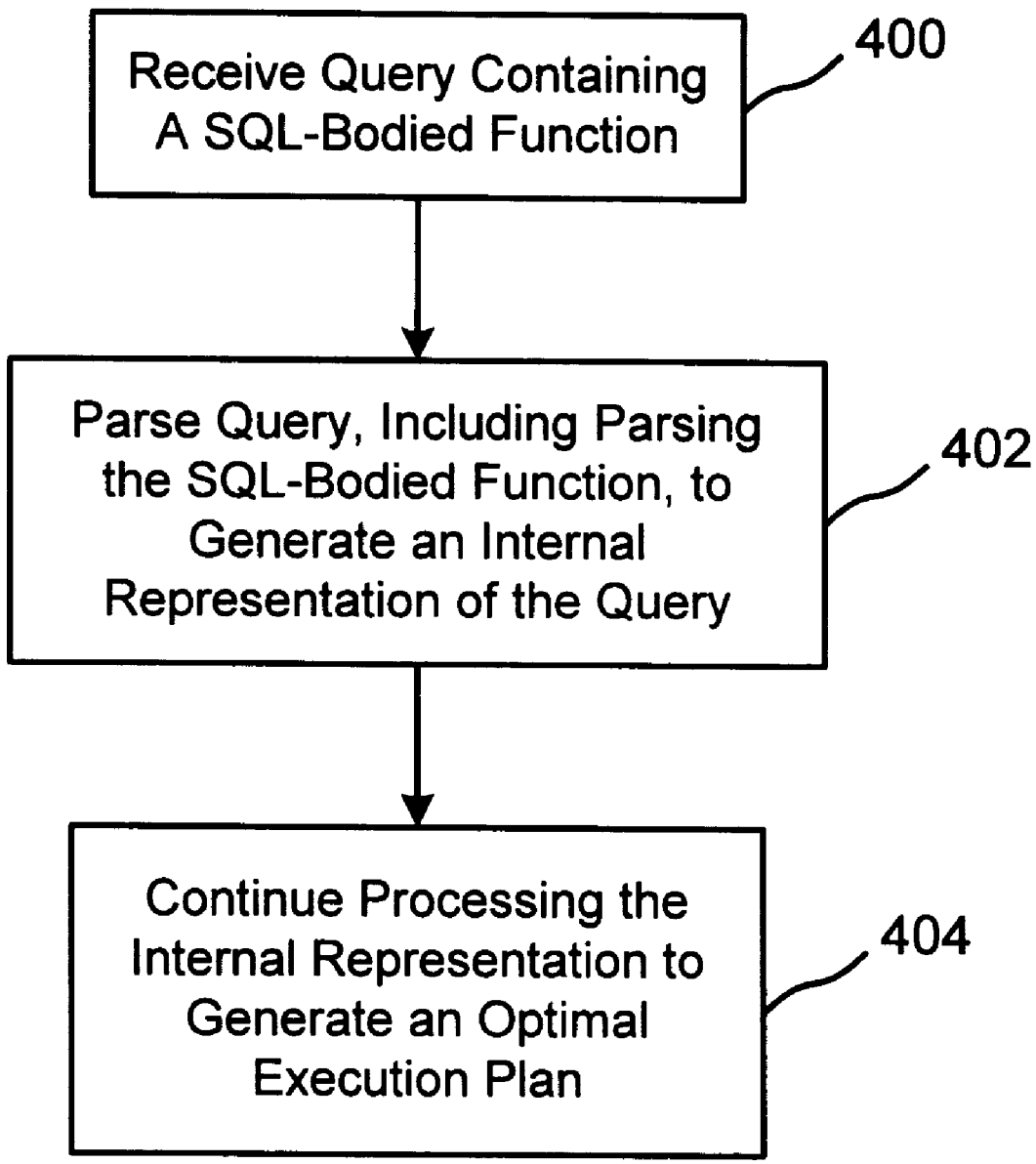
FIG. 4 is a flow diagram illustrating the steps performed by the intelligent compiler component upon receiving a query containing a SQL-bodied function.

FIG. 4 is a flow diagram illustrating the steps performed by the intelligent compiler component 100 upon receiving a query containing a SQL-bodied function. In Block 400, the parser 102 receives a query containing a SQL-bodied functions. In block 402, the intelligent compiler component 100, in conjunction with the parser 102, parses the query to generate an internal representation of the query. In particular, the intelligent compiler component 100 contains the functionality to parse the SQL-bodied function. In Block 404, the intelligent compiler component 100 forwards the generated internal representation to other components for further processing to generate an optimal execution plan.

Intelligent Compilation of SQL Scripting Language

The present invention compiles SQL scripting language within the parser 102 using the intelligent compiler component 100. Conventional systems that implement the SQL scripting language do not perform parsing of the scripting language. Instead, conventional systems perform the extra steps of processing SQL scripting language statements separately from the parser. Unlike conventional systems, the present invention is able to perform the parsing of the SQL scripting language statements in one pass within the parser.

The intelligent compiler component 100, in conjunction with the parser 102, parses the query containing SQL scripting language statements. The intelligent compiler component 100 modifies the query graph model 114 that a traditional parser 102 generates. The intelligent compiler component provides the "glue" that modifies the query graph model to reflect the parsing of SQL scripting language statements. The modified query graph model 114 is then ready to be used by the query global semantics component 104, the query rewrite and transform component 106, the plan optimization component 108, and the threaded codegen component 110 to generate an optimal execution plan, without the need for modifying any of these components. The intelligent compiler component 100 enables optimal execution of SQL scripting language statements.

The intelligent compiler component 100 addresses simple sequencing of statements, local variables, sequencing with early exit and return, iteration, table return, case statements, shallow and deep correlation, and splitting of common subexpressions. Each of these elements will be discussed below in further detail.

In SQL, a sequence can be represented by the following format:

```
BEGIN ATOMIC
    SQL-stmt₁;
    . . .
    SQL-stmtₙ;
END
```

A sequence is an atomic set of statements. The statements may be any SQL statements, such as SELECT. The intelligent compiler component 100 translates the above sequence into the following compiled SQL form:

```
SELECT 1 FROM VALUES (1)
    WHERE 1 > CASE WHEN EXISTS (SQL-stmt₁ WHERE 1 = 0)
        THEN 1
    . . .
    WHEN EXISTS (SQL-stmtₙ WHERE 1 = 0)
        THEN 1
    ELSE 1 END;
```

The compiled SQL statement incorporates a CASE expression that evaluates the WHERE predicate (1=0) for each record produced by each statement. Since this predicate evaluates to FALSE for every record, the values of an entire statement are exhausted, finally resulting in FALSE for its containing EXISTS clause, causing the processing of the CASE statement to drop to the next WHEN predicate to process the next statement. That is, the CASE statement is generated by the intelligent compiler component 100 so that all statements are processed. The intelligent compiler component 100 translates the sequence into compiled SQL statements that can be understood by the query rewrite and transform component 106, the plan optimization component 108, and the threaded codegen component 110, thereby enabling the generation of an optimal execution plan for the query containing SQL scripting language statements.

Figure 5:
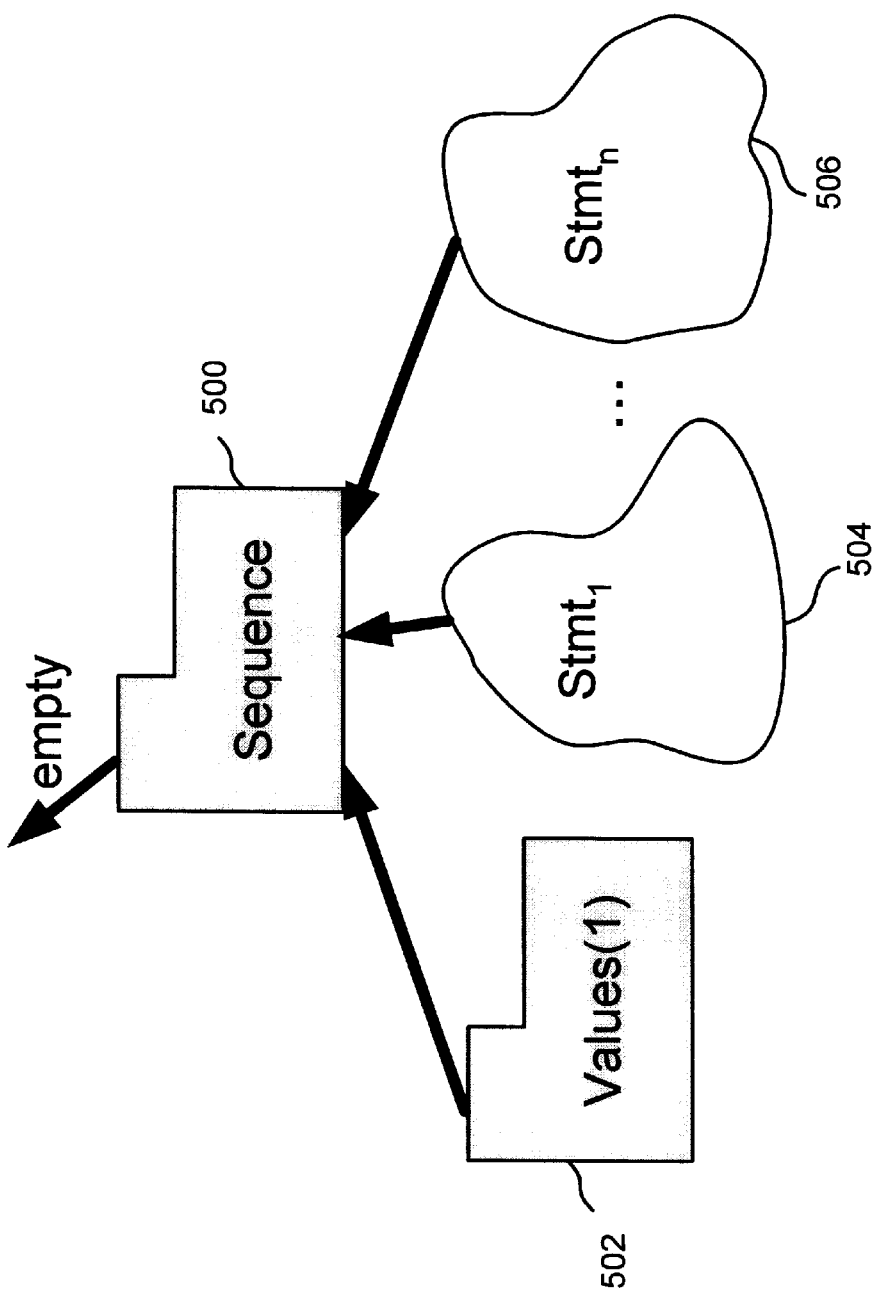
FIG. 5 illustrates a query graph model generated by the intelligent compiler component that corresponds to the compiled SQL statements for a sequence.

FIG. 5 illustrates a query graph model generated by the intelligent compiler component 100 that corresponds to the compiled SQL statements for the sequence. The Sequence box 500 receives as input data from the Values box 502 and receives each statement 504, 506. The Sequence box 500 processes each statement and does not return anything (i.e., the return data is empty).

In SQL, local variables can be represented by the following format:

> DECLARE $var_1$,
> ...
> $var_n$ $type_x$;
> DECLARE $var_m$,
> ...
> $var_p$ $type_y$;

The intelligent compiler component 100 translates the above statements into the following compiled SQL form:

> SELECT CAST(NULL AS $type_1$) AS $var_1$, ... CAST(NULL AS $type_p$) AS $var_p$ FROM VALUES (1);

The CAST function ensures that a buffer length of the appropriate length is determined for each variable, depending on its type.

In SQL, the use of local variables with a sequence can be represented by the following format:

> label:   BEGIN ATOMIC
> DECLARE $var_n$ $type_x$;
> DECLARE $var_p$ $type_y$;
> SQL-$stmt_1$;
> ...
> SQL-$stmt_n$;
> END label The intelligent compiler component 100 translates the above statements into the following compiled SQL form:

```
SELECT 1 FROM VarTable
    WHERE 1 > CASE WHEN EXISTS (SQL-stmt₁ WHERE 1 = 0)
        THEN 1
    ...
    WHEN EXISTS (SQL-stmtₙ WHERE 1 = 0)
        THEN 1
    ELSE 1 END;
```

The VarTable is defined by the SELECT statement from the compiled SQL form of the SQL format for defining local variables, discussed above. The compiled SQL statements indicate the amount of memory created for variables through the use of the VarTable (i.e., variable table).

Figure 6:
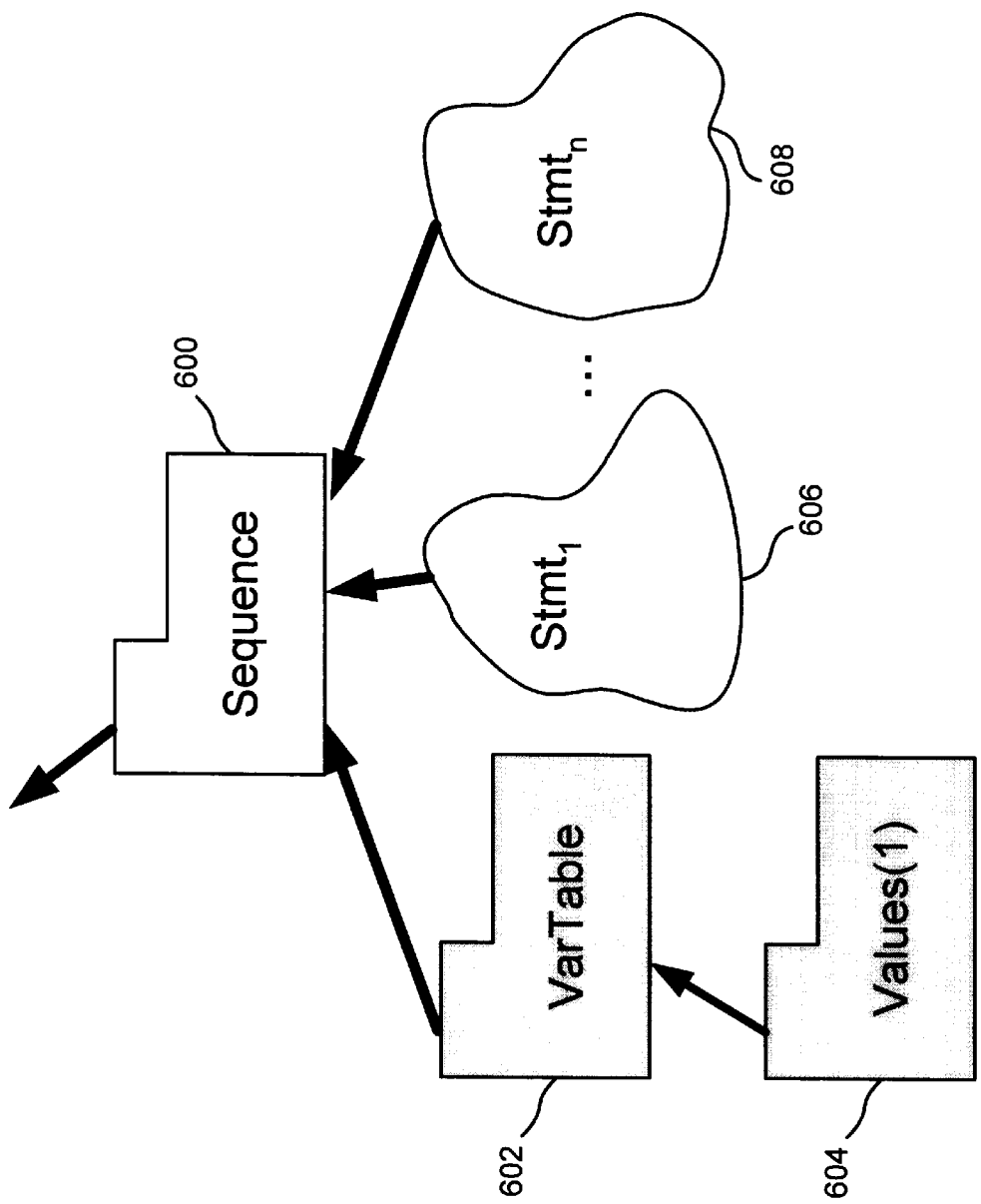
FIG. 6 illustrates a query graph model generated by the intelligent compiler component that corresponds to the compiled SQL statements for defining and using local variables.

FIG. 6 illustrates a query graph model generated by the intelligent compiler component 100 that corresponds to the compiled SQL statements for defining and using local variables. The VarTable box 602 receives input data from the Values box 604 and allocates buffers for variables The Sequence box 600 processes each statement 606, 608 that it receives as input.

In SQL, the setting local variables can be represented by the following format:

> SET $var_1$=$expr_1$, ... $var_n$=$expr_n$;

The intelligent compiler component 100 translates the above statement into the following compiled SQL form:

> SELECT assignment ($expr_1$, $var_1$), ... assignment($expr_n$, $var_n$) FROM VALUES (1)

The assignment statement overwrites the buffer location allocated via the VarTable for the variable (e.g., $var_1$) by the expression (e.g., $expr_1$). This sets the variable to the expression. For example, the variable x might be set to 3. Then, an assignment statement would read assignment(3, x), and the value 3 would be written to the buffer location for the variable x.

Figure 7:
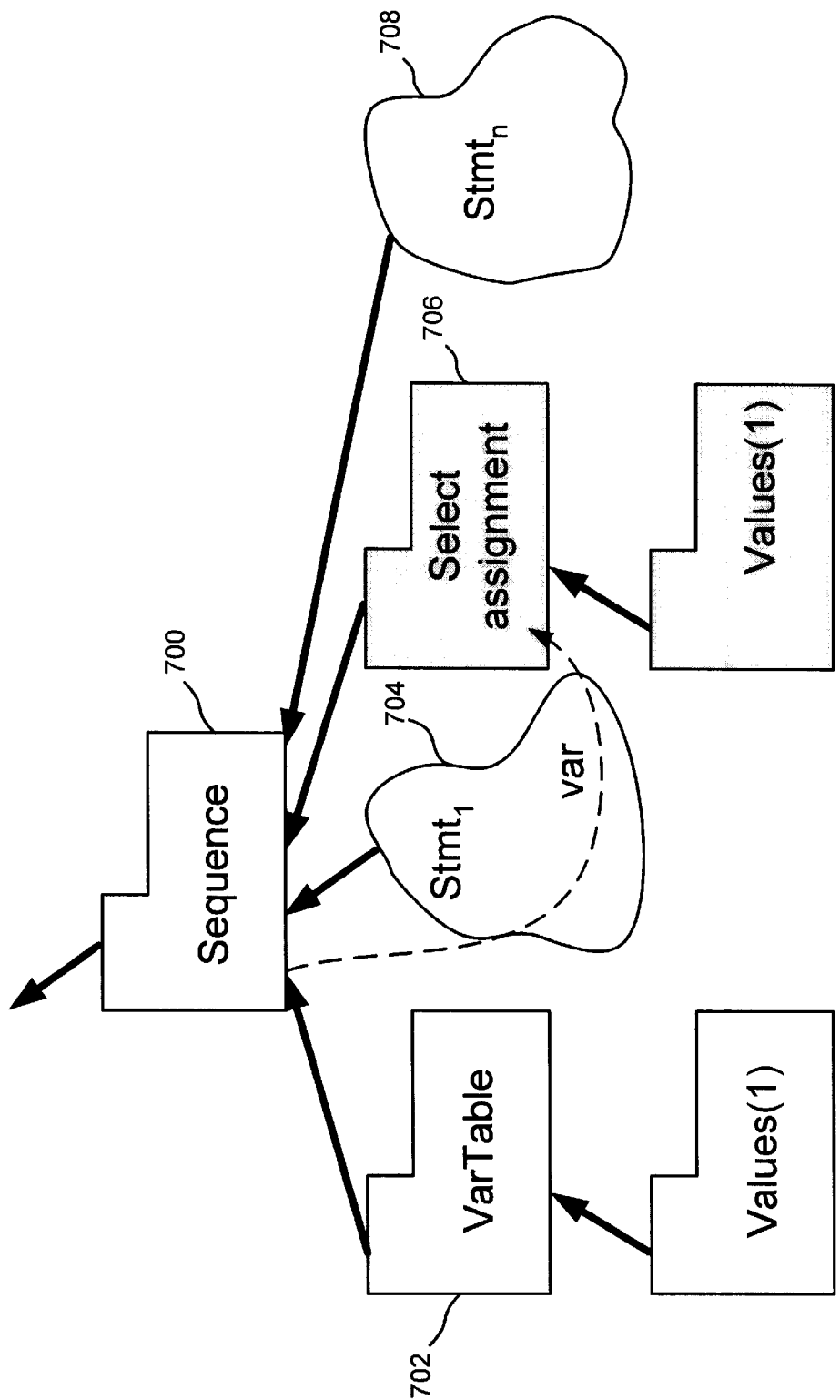
FIG. 7 illustrates a query graph model generated by the intelligent compiler component that corresponds to the compiled SQL statement for the setting of local variables.

FIG. 7 illustrates a query graph model generated by the intelligent compiler component 100 that corresponds to the compiled SQL statement for the setting of local variables. The Sequence box 700 processes each statement 704, 706, and 708. In particular, the Sequence box 700 processes the assignment statement 706. The variables, whose buffers are allocated via the VarTable 702, are accessed in the Select assignment box 706 through correlation. The Select assignment box processes the SELECT assignment statement and passes the results to the Sequence box 700.

In SQL, the return statement can be represented by the following format:

> RETURN expr;

To affect the return, two hidden variables, "return" and "state" are added to the VarTable and initialized to NULL. This is equivalent to having the following implicit definitions:

> DECLARE return rType; state INT;

> SET state=NULL, return=NULL;

When the return statement is encountered, the intelligent compiler component 100 compiles the simple assignment into the following SQL form:

> SET state=0, return=expr;

The intelligent compiler component translates the return statement to a simple assignment statement. Two variables, state and return, are used to return a value. The state variable represents a return code which, in this case, is set to zero. When the state variable has the appropriate return code, the return variable is used to return an expression.

Figure 8:
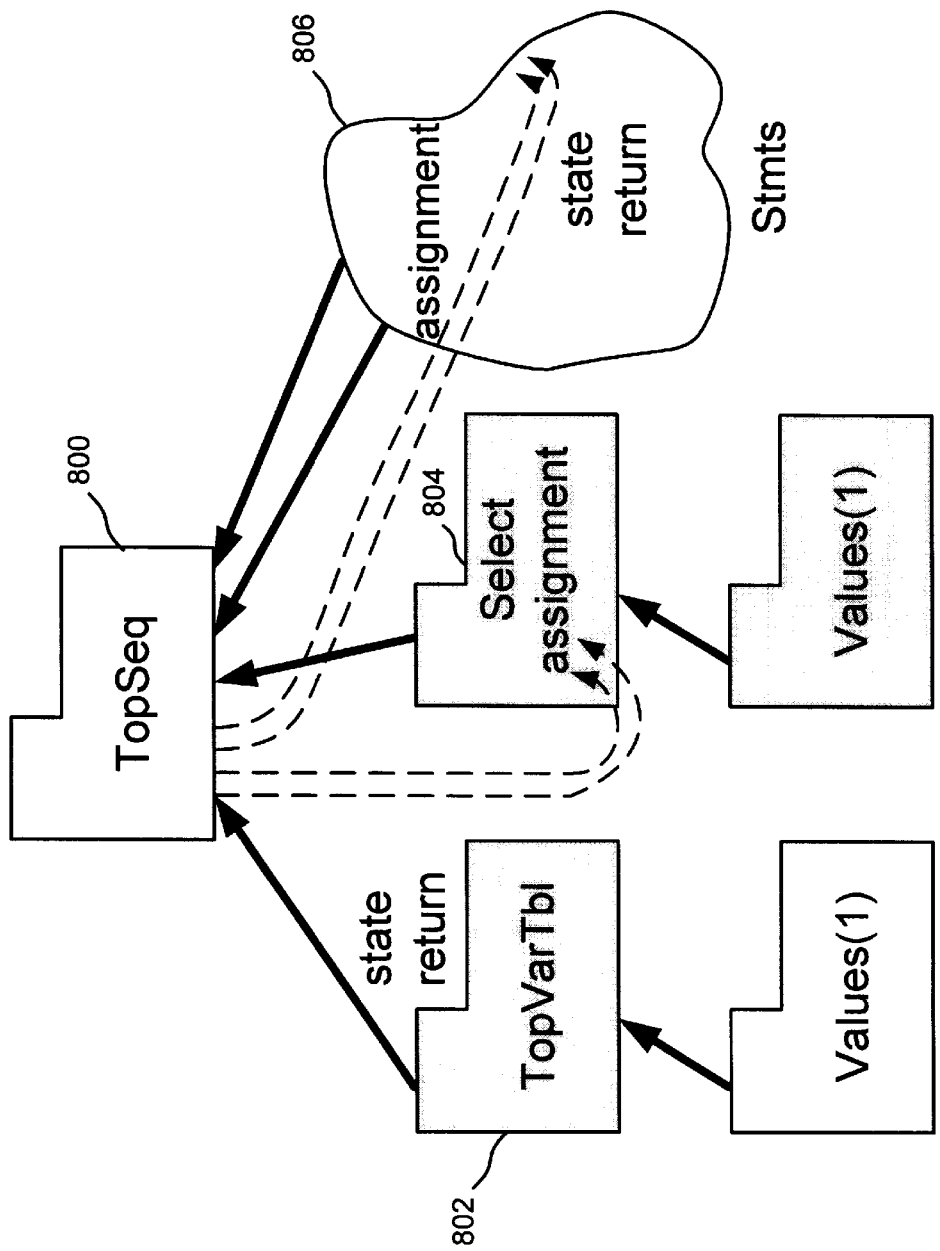
FIG. 8 illustrates a query graph model generated by the intelligent compiler component that corresponds to the compiled SQL statements for a return in a sequence.

FIG. 8 illustrates a query graph model generated by the intelligent compiler component 100 that corresponds to the compiled SQL statements for a return in a sequence. The buffers for the state and return variables are allocated via the TopVarTable box 802. The Select box 804 is added to perform the initialization of the variables and to access the state and return variables via correlation to the TopSeq box 800. The return statement is implemented by the assignment in the subgraph 806, which also accesses the state and return variables via correlation to the TopSeq box 800.

In some cases an early exit is required while executing a sequence and when the computer system enters a particular state. In order to handle early exits, the intelligent compiler component 100 generates the following compiled SQL for sequencing:

```
SELECT 1 FROM VarTable
    WHERE 1 > CASE WHEN EXISTS (SQL-stmt₁ WHERE 1 = 0)
        THEN 1
        WHEN state < levelₘ THEN 1
    ...
    WHEN state < levelₘ THEN 1
    WHEN EXISTS (SQL-stmtₘ WHERE 1 = 0)
        THEN 1 ELSE 1 END;
```

Typically, a CASE expression used to implement sequencing does not allow for an early exit. However, the intelligent compiler component 100 generates a CASE expression that does allow an early exit. The CASE expression uses a state variable, which represents a return code, and a $level_m$ constant, which identifies a nesting level. The state variable is compared to the $level_m$ constant. When the comparison fails, an early exit is performed. The use of the $level_m$ constant enables identification of the level at which to exit, that is, the $level_m$ constant allows multiple nesting exit control.

Figure 9:
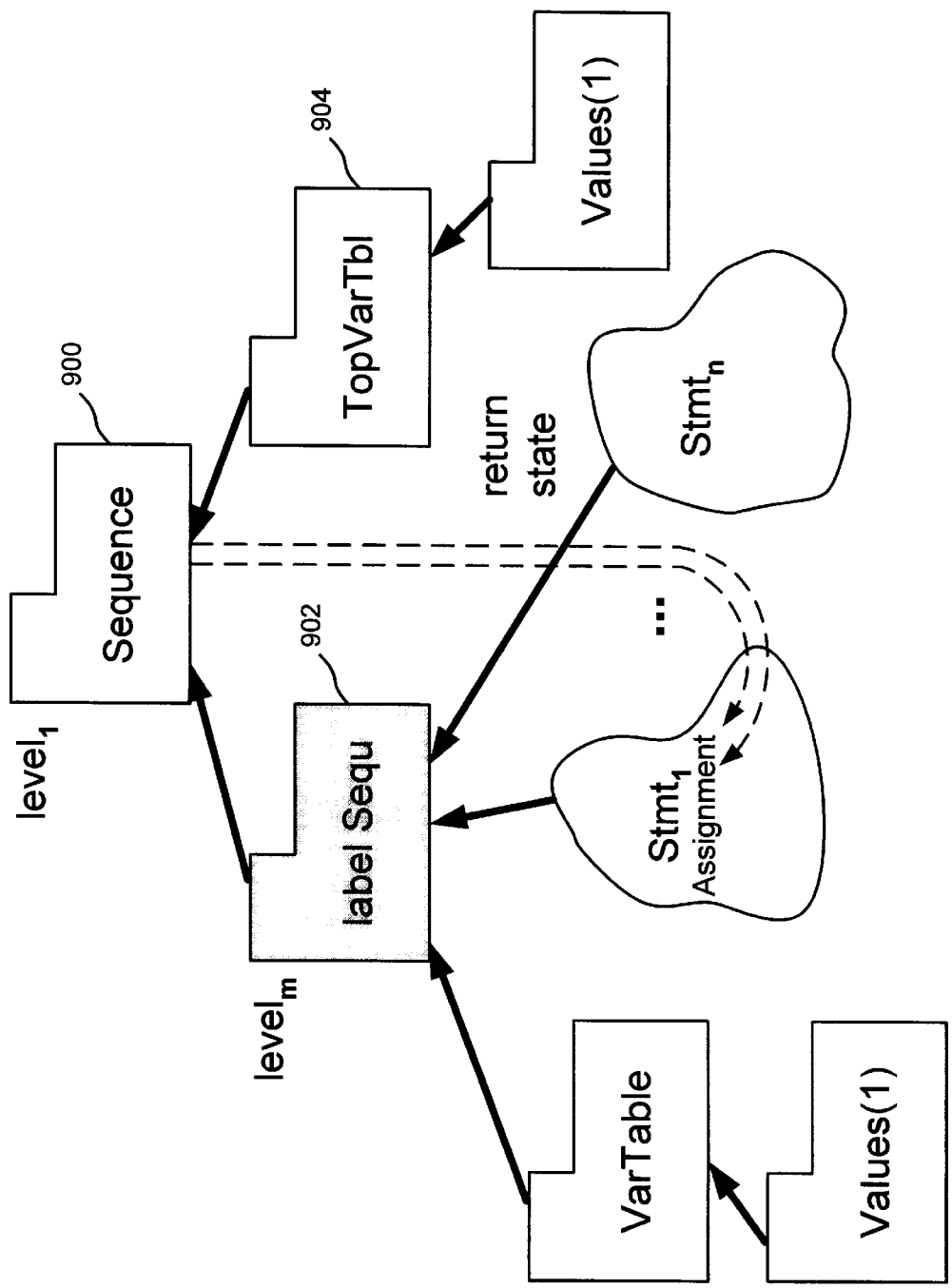
FIG. 9 illustrates a query graph model generated by the intelligent compiler component that corresponds to the compiled SQL statements for an early exit in a sequence.

FIG. 9 illustrates a query graph model generated by the intelligent compiler component 100 that corresponds to the compiled SQL statements for an early exit in a sequence. Buffer space for the variables are allocated in the TopVarTbl box 904. The Sequence box 900 has one statement that it executes, which is from the labelSequ box 902. When there is an early exit, the state variable is set to zero.

In SQL, iteration can be represented by the following format:

```
BEGIN ATOMIC
    DECLARE i, sum INT;
    SET i = 0, sum = 0;
count:
    LOOP
        SET i = i + 1;
        IF i = 5 THEN CONTINUE count
        ELSEIF i = 8 THEN LEAVE count END IF;
        SET sum = sum + i;
    END LOOP count;
END
```

The CONTINUE predicate exits the body of the loop early and starts it again for the next iteration. The LEAVE predicate breaks out of the loop. Additionally, WHILE or UNTIL predicates can be added to the iteration.

The intelligent compiler component 100 translates the above statements into the following compiled SQL form:

(LEAVE label) SET state=$level_m$-2;

(CONTINUE label) SET state=$level_m$-1;

(Loop) SELECT 1 FROM VALUES(1) WHERE EXISTS(body-sequence);

```
(Body-Sequence)
SELECT 1 FROM Iterator, VarTable
WHERE level_m - 1 > CASE
            WHEN EXISTS(stmt_1 WHERE 1 = 0)
            THEN state
            WHEN state < level_m THEN state
            ...
            ELSE state END
```

The label for the LOOP is at $level_m$-1. Hence, when the state is at $level_m$-1, the intelligent compiler component 100 continues to the next iteration, and when the state is at $level_m$-2, the intelligent compiler component 100 breaks out of the loop. The iterator can generate an infinite number of integers or it can be a subquery that generates values identifying multiple iterations. The intelligent compiler component 100 generates an optimization so that once an existential is true, an early exit is performed.

Figure 10:
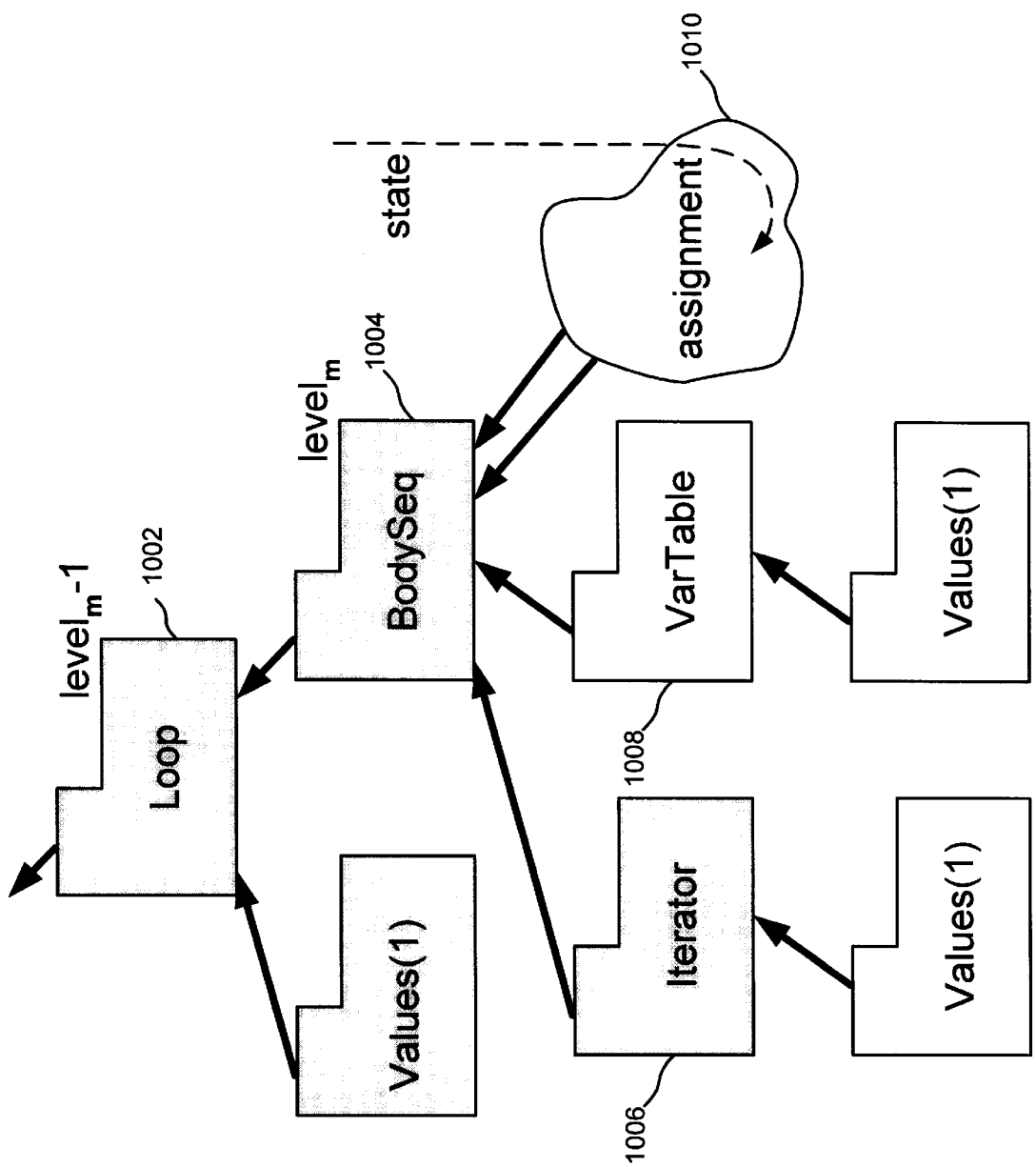
FIG. 10 illustrates a query graph model generated by the intelligent compiler component that corresponds to the compiled SQL statements for iteration.

FIG. 10 illustrates a query graph model generated by the intelligent compiler component 100 that corresponds to the compiled SQL statements for iteration. The BodySeq box 1004 executes for each row generated by the Iterator box 1006, which can either generate an infinite number of integers or could return only those values generated by a user specified SQL query. The VarTable box 1008 allocates buffer space for the hidden return and state variables as well as any other variables explicitly declared by a function. Using the optimization mentioned above, the Loop box 1002 processes the BodySeq box 1004 either until it consumes the records generated by the iterator or until it returns one TRUE value, which occurs only when an early exit or return statement occurs. The assignment in the subgraph 1010 accesses the state variable via correlation and performs an assignment.

In SQL, return of a table can be represented by the following format:

```
CREATE FUNCTION Foo(x INT) RETURNS TABLE (c_1 INT)
    LANGUAGE SQL READS SQL DATA
    BEGIN ATOMIC
        DECLARE var INT;
        SET var = 2 * x;
        RETURN SELECT c_1 FROM T_1 WHERE var * x < c_1;
    END
```

The above function returns a scalar $c_1$. However, sometimes it is preferable to return a table. The intelligent compiler component 100 is able to compile the function so that a table is returned.

Figure 11:
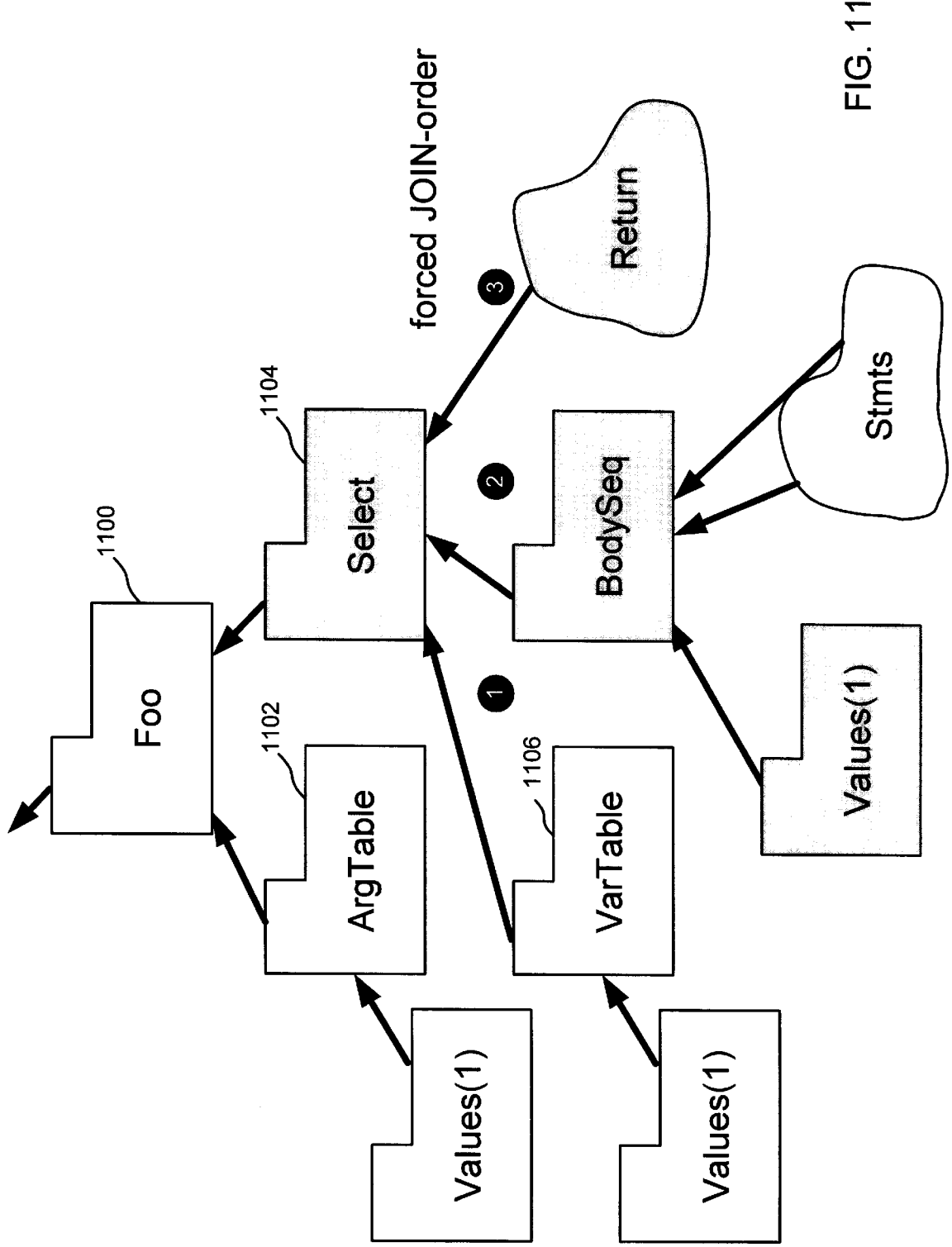
FIG. 11 illustrates a query graph model generated by the intelligent compiler component that corresponds to the compiled SQL statements for a table return.

FIG. 11 illustrates a query graph model generated by the intelligent compiler component 100 that corresponds to the compiled SQL statements for a table return. The Foo box 1100 is a SELECT box that represents the results of computing the block of statements in the function Foo (i.e., the statements between the BEGIN and END). The SELECT box 1104 implements the block of statements in the function Foo. Buffers for the return and state variables are allocated by the ArgTable box 1102, and buffers for the local variables for the block of statements in the function Foo are allocated by the VarTable box 1106. The SELECT box 1100 that implements the function Foo returns the results of computing the function Foo by Select box 1104.

In SQL, a CASE statement can be represented by the following format:

```
CASE expr_0
    WHEN expr_1 THEN stmt_1
    ...
    WHEN expr_n THEN stmt_n
    ELSE expr_{n+1}
END CASE
```

The intelligent compiler component 100 provides support for a CASE statement with the use of CASE expressions that are already supported by the SQL compiler. The statement evaluates $expr_0$ and executes the $stmt_j$ that corresponds to the first $expr_i$ that equals the result of evaluating $expr_0$. The intelligent compiler component 100 translates the above statements into the following compiled SQL form that employs the CASE expression supported by the SQL compiler:

```
SELECT 1 FROM VALUES(1)
    WHERE 1 = CASE expr_0
        WHEN expr_1
            THEN (CASE WHEN EXISTS(stmt_1)
                THEN 1 ELSE 1)
        ...
        WHEN expr_n
            THEN (CASE WHEN EXISTS(stmt_n)
                THEN 1 ELSE 1)
        ELSE (CASE WHEN EXISTS(stmt_{n+1})
                THEN 1 ELSE 1)
        END
```

Figure 12:
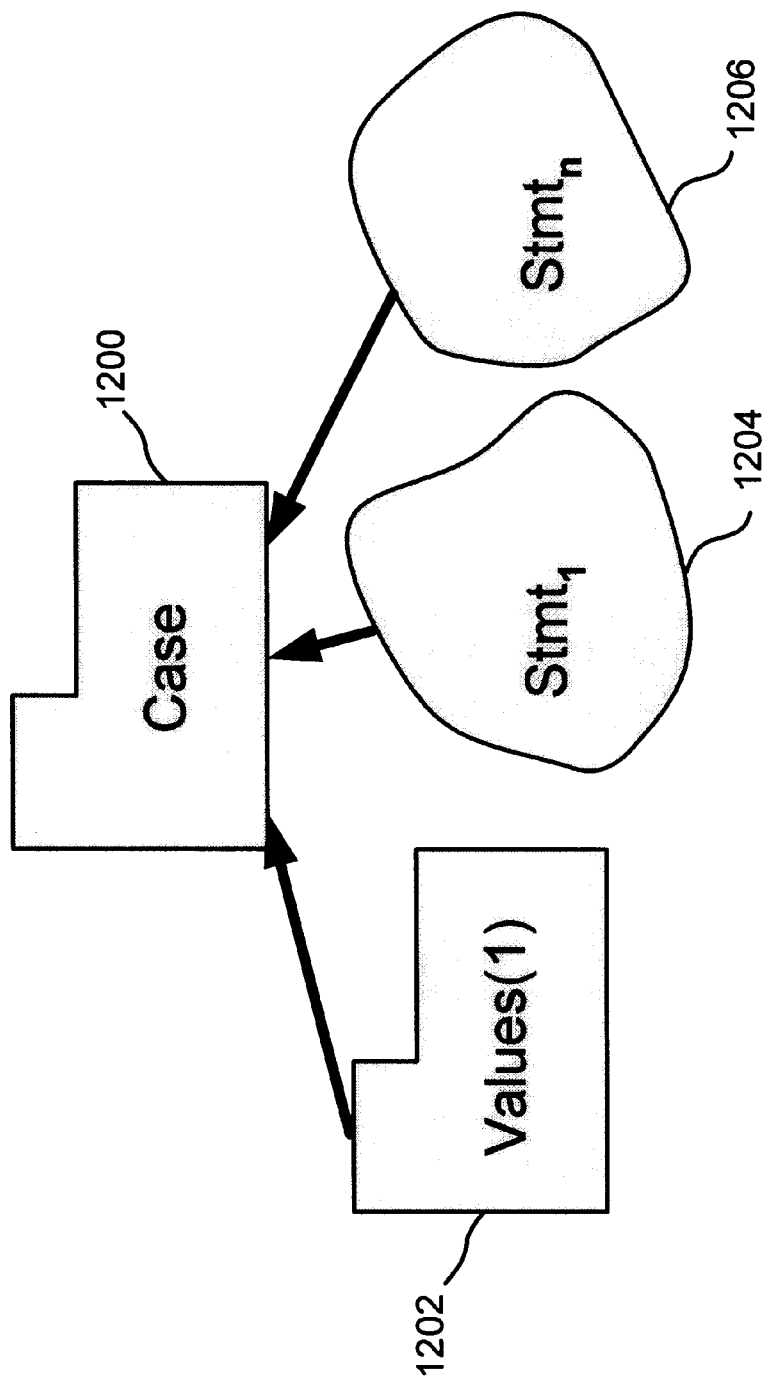
FIG. 12 illustrates a query graph model generated by the intelligent compiler component that corresponds to the compiled SQL statements for a CASE statement.

FIG. 12 illustrates a query graph model generated by the intelligent compiler component 100 that corresponds to the compiled SQL statements for a CASE statement. The Case box 1200 receives input data from the Values box 1202 and receives statements 1204, 1206, which are processed in the Case box 1200.

The following is an example that demonstrates the need for shallow correlation:

```
CREATE FUNCTION foo() RETURNS INT
    LANGUAGE SQL EXTERNAL ACTION READS SQL DATA
    BEGIN ATOMIC
        FOR this AS SELECT * FROM T_1 DO
            SELECT sideeff() FROM T_2;
        END FOR;
        RETURN 0;
    END
```

The function sideeff has sideeffects and must be reevaluated for each iteration of the loop (i.e., for every row from table $T_1$). A conventional optimizer does not recognize that the SELECT statement requires multiple execution. However, when the intelligent compiler component 100 recognizes that function Foo has sideeffects, it adds a predicate that forces correlation to a variable whose value changes for each iteration of the loop. The intelligent compiler component 100 translates the above example into the following compiled SQL form:

```
CREATE FUNCTION foo() RETURNS INT
    LANGUAGE SQL EXTERNAL ACTION READS SQL DATA
    BEGIN ATOMIC
        FOR this AS SELECT *, CONSEC() AS c
            FROM T_1 DO SELECT sideeff() FROM T_2
                WHERE this.c <> 0;
        END FOR;
        RETURN 0;
    END
```

The consec ( ) function produces many arbitrary nonzero results that guarantee that each statement will be evaluated. This is especially useful for the UPDATE, DELETE, and INSERT statements, for statements with sideeffects and for statements that use local variables.

Figure 13:
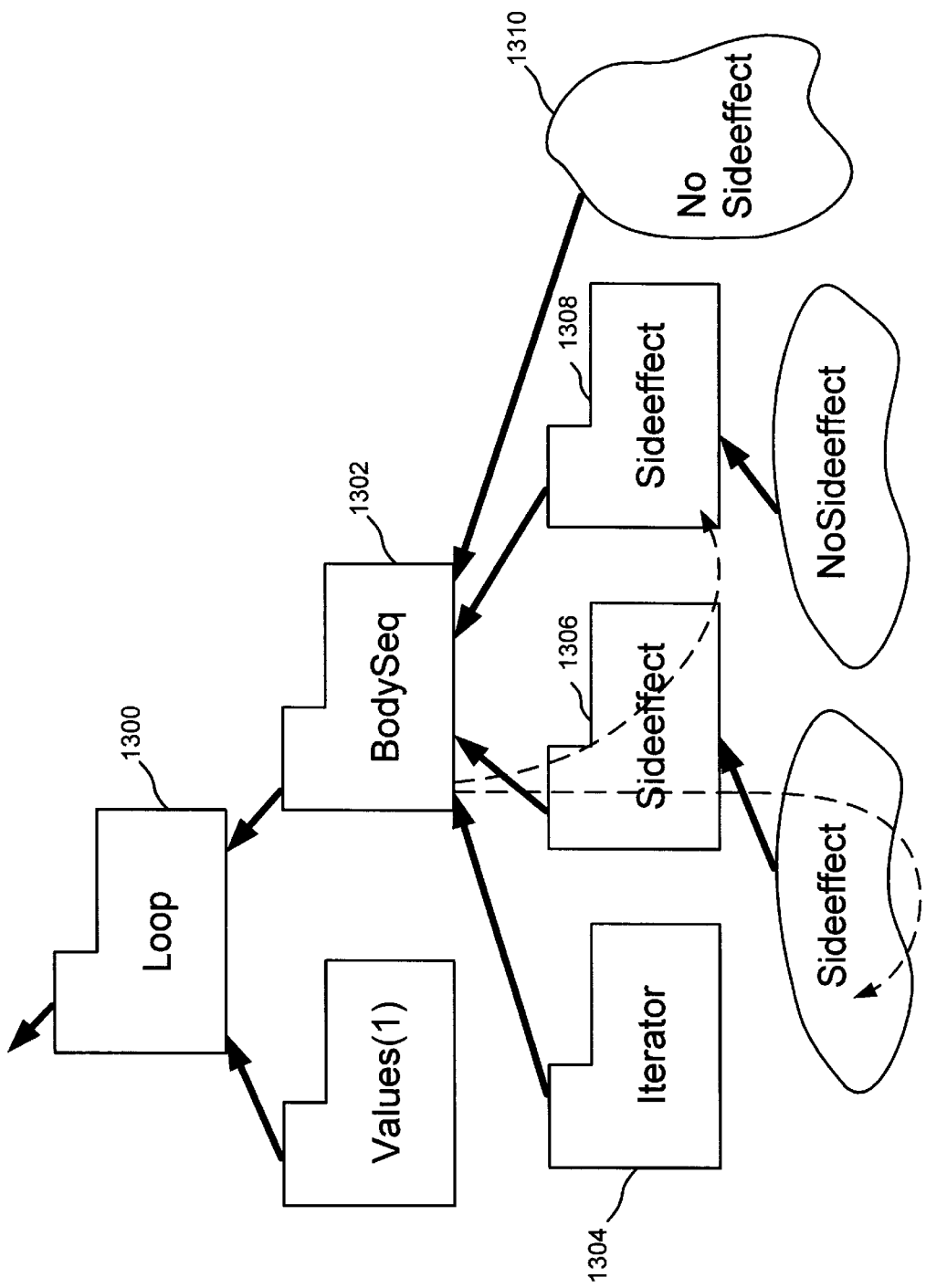
FIG. 13 illustrates a query graph model generated by the intelligent compiler component that corresponds to the compiled SQL statements for shallow correlation.

FIG. 13 illustrates a query graph model generated by the intelligent compiler component 100 that corresponds to the compiled SQL statements for shallow correlation. The BodySeq box 1302 executes for each row generated by the Iterator box 1304 using the results of the Siedeeffect and No Sideeffect boxes 1306, 1308, 1310 for use in determining sideeffects for a particular sequence. The Loop box 1300 processes the BodySeq box 1302 until it consumes the records generated by the Iterator box 1304 or until an early exit or return statement occurs.

The following is an example that demonstrates a need for deep correlation:

```
CREATE FUNCTION foo() RETURNS INT
    LANGUAGE SQL MODIFIES SQL DATA
    BEGIN ATOMIC
        FOR this AS SELECT * FROM T_1 DO
            UPDATE T_2 SET c_2 = c_2 + 1;
            INSERT INTO T_3 SELECT * FROM T_2;
        END FOR;
        RETURN 0;
    END
```

This example results in the column $T_2.c_2$ for each row of table $T_2$ being incremented for the total number of rows in table $T_1$. Table $T_3$ contains all of the intermediate results of this increment. A conventional optimizer does not recognize that reloading table $T_2$ may be required for each iteration through the loop in order to pickup the new values in table $T_2$ to insert into table $T_3$. Actually, the reloading is also required during each iteration so that the UPDATE gets the most recent values of table $T_2$ when determining its update values. An erroneous execution of this function would cause the UPDATE to increment column $T_2.c_2$ by some number less than the total number of rows in table $T_1$. Most likely, the error case would increment exactly once. Therefore, the intelligent compiler component 100 forces this reloading by adding a predicate to the read of table $T_2$ that accesses a column that cannot be temped.

The intelligent compiler component 100 translates the example into the following compiled SQL form:

```
CREATE FUNCTION foo() RETURNS INT
    LANGUAGE SQL MODIFIES SQL DATA
    BEGIN ATOMIC
        FOR this AS SELECT * FROM T_1,
            CONSEC() AS c DO
            UPDATE T_2 SET c_2 = c_2 + 1
                WHERE this.c <> T_2 · TID;
            INSERT INTO T_3 SELECT * FROM T_2 WHERE
                this.c <> T_2 · TID + 1;
        END FOR;
        RETURN 0;
    END
```

Figure 14:
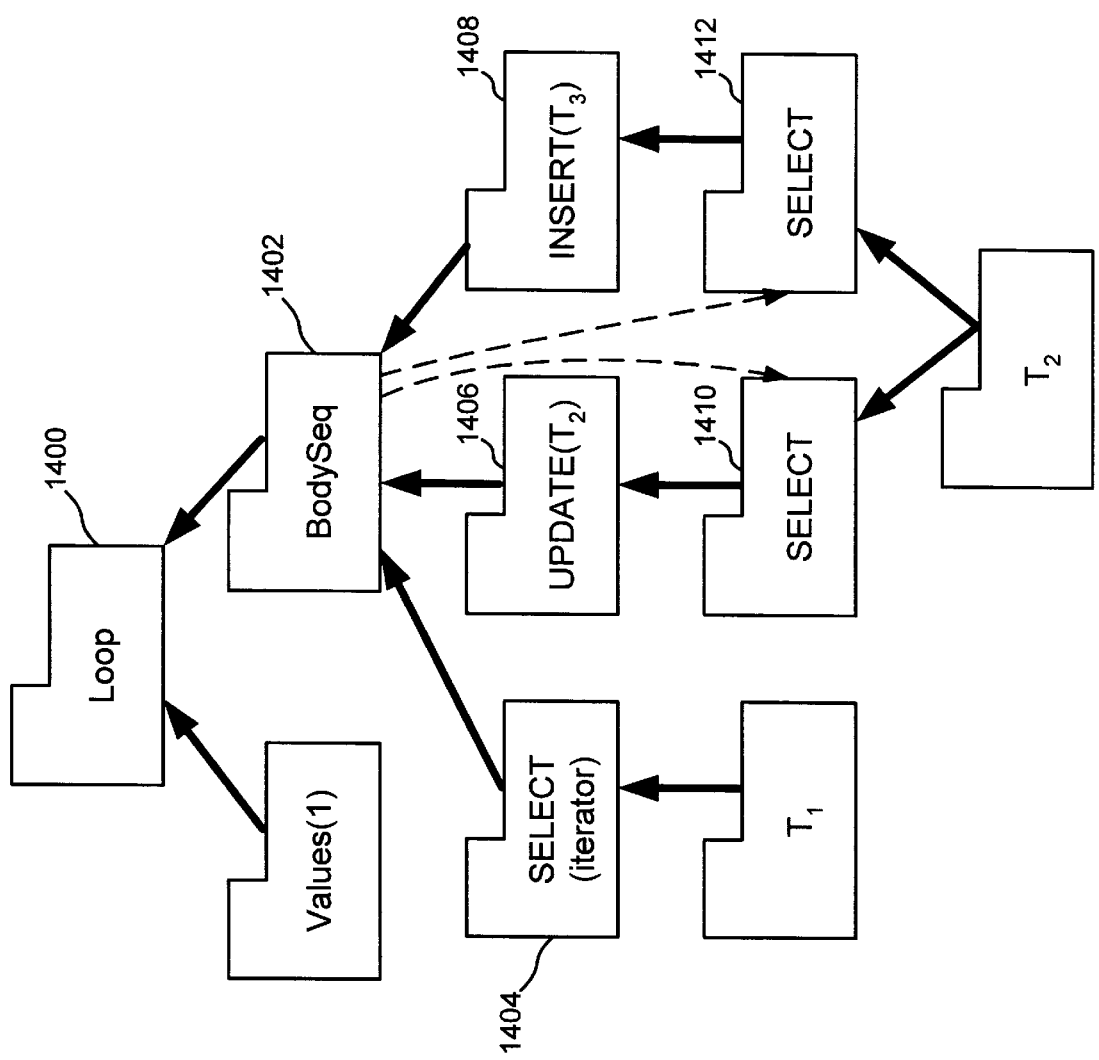
FIG. 14 illustrates a query graph model generated by the intelligent compiler component that corresponds to the compiled SQL statements for deep correlation.

FIG. 14 illustrates a query graph model generated by the intelligent compiler component 100 that corresponds to the compiled SQL statements for deep correlation. The BodySeq box 1402 sequences the execution of UPDATE AND INSERT statements from the UPDATE box 1406 and the INSERT box 1408 for each iteration through the loop. The Iterator box 1404 in this case is a SELECT box over table $T_1$ with the CONSEC function as an extra column. Reloading of base table $T_2$ for SELECT boxes 1410 and 1412 is guaranteed by deep correlation of their tuple-id (TID) columns with the CONSEC function, which is added as a column of the SELECT box 1404. The Loop box 1400 processes the BodySeq box 1402 until it consumes the records generated by the Iterator box 1404 or until an early exit or return statement occurs.

Deep and shallow correlation also apply when the function itself is referenced by a loop and included in the context of other SQL statements. The intelligent compiler component 10 recognizes interactions between the compiled in function and the containing query, hence allowing reuse of results where it is semantically safe to do so.

The following is an example that demonstrates a need for the splitting of common subexpressions:

```
CREATE VIEW V_2 AS SELECT * FROM T_2
    WHERE c_1 IN (1, 3, 5, 7)
CREATE FUNCTION foo() RETURNS INT
    LANGUAGE SQL MODIFIES SQL DATA
    BEGIN ATOMIC
        INSERT INTO T_3 SELECT * FROM V_2;
        DELETE FROM T_2 WHERE c_1 > 3;
        INSERT INTO T_4 SELECT * FROM V_2;
    END
```

In some cases, the intelligent compiler component 100 constructs a query graph that allows the sharing of the results of a view within the query as an optimization. This sharing creates a common subexpression in the query graph. However, it is not always semantically correct to share the results of a view. The query global semantics component 104 determines when this is the case and indicates that the view computation should not be shared. We say that the common subexpression is "split" in these cases.

The determination of such splitting (and deep and shallow correlation) is typically performed during the resolution of read/write conflicts, which is more fully described in U.S. Pat. No. 5,546,576 for "Query Optimizer System That Detects and Prevents Mutating Table Violations of Database Integrity in a Query Before Execution Plan Generation," issued to Cochrane et al. on Aug. 13, 1996, and which is incorporated by reference herein.

Figure 15:
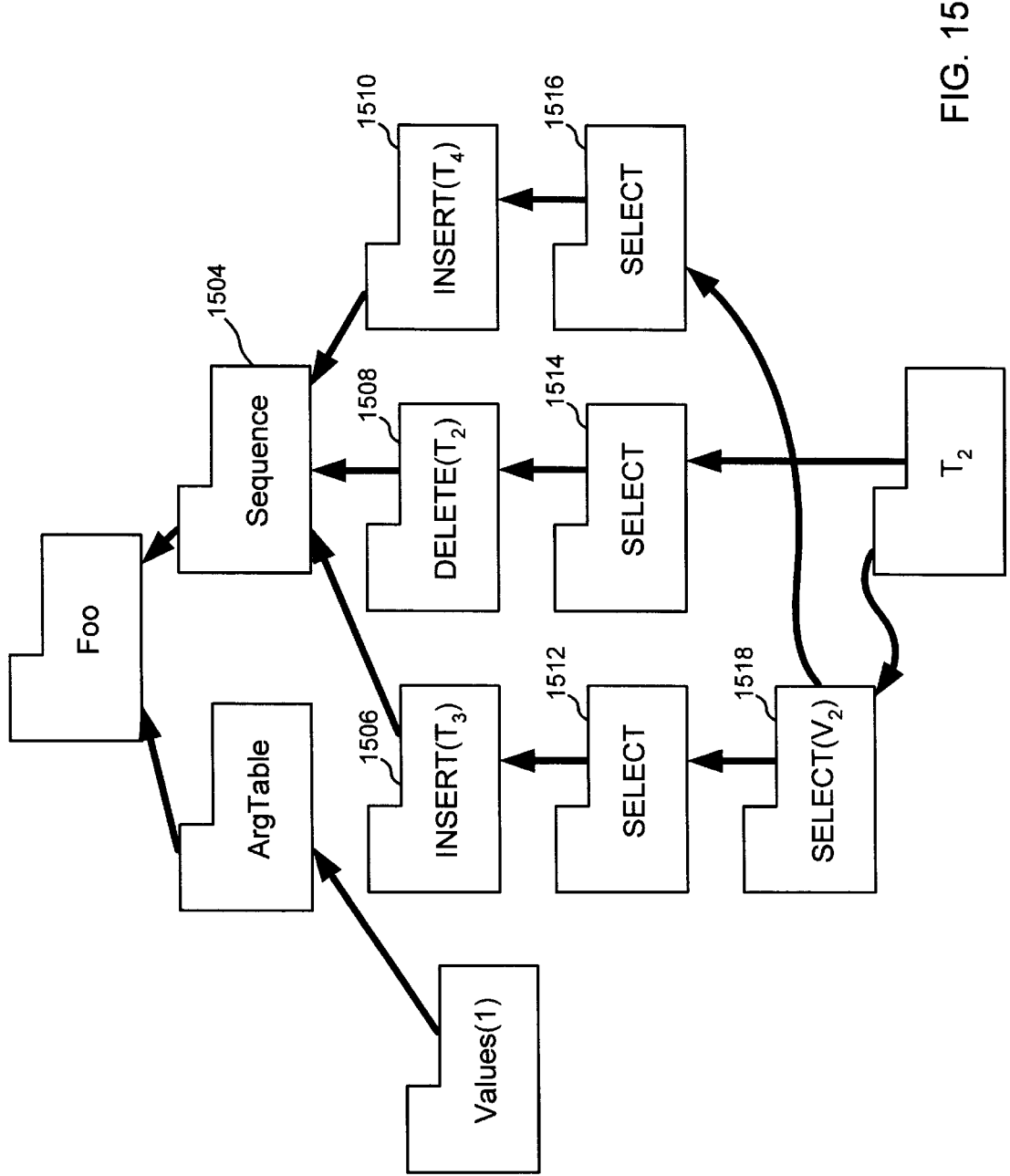
FIG. 15 illustrates a query graph model generated by the intelligent compiler component corresponding to the compiled SQL statements prior to the splitting of a common subexpression.

FIG. 15 illustrates a query graph model generated by the intelligent compiler component 100 corresponding to the compiled SQL statements for the above example prior to the splitting of the common subexpression. The ArgTable box 1502 does not allocate space for any buffers since there are no arguments. The body of the function is a Sequence box 1504 for sequencing the three statements in the function. The first Statement box 1506 is an insert into table $T_3$, the second Statement box 1508 is a delete from table $T_2$, and the third statement box 1510 is an insert into table $T_4$. SELECT boxes 1512 and 1516 both SELECT from view $V_2$, represented by SELECT box 1518 to insert into their respective tables. However, the intervening DELETE box 1508 deletes from table $T_2$, which is the underlying base table of view $V_2$. The SELECT box 1514 identifies he rows from table $T_2$ that should be deleted by the DELETE box 1508. In this example, if the results of view $V_2$ are computed by the SELECT box 1518 and shared by both SELECT box 1512 and SELECT box 1516, the INSERT box 1510 will not reflect the modifications of the DELETE box 1508. Hence the common subexpression 1518 must be split.

Figure 16:
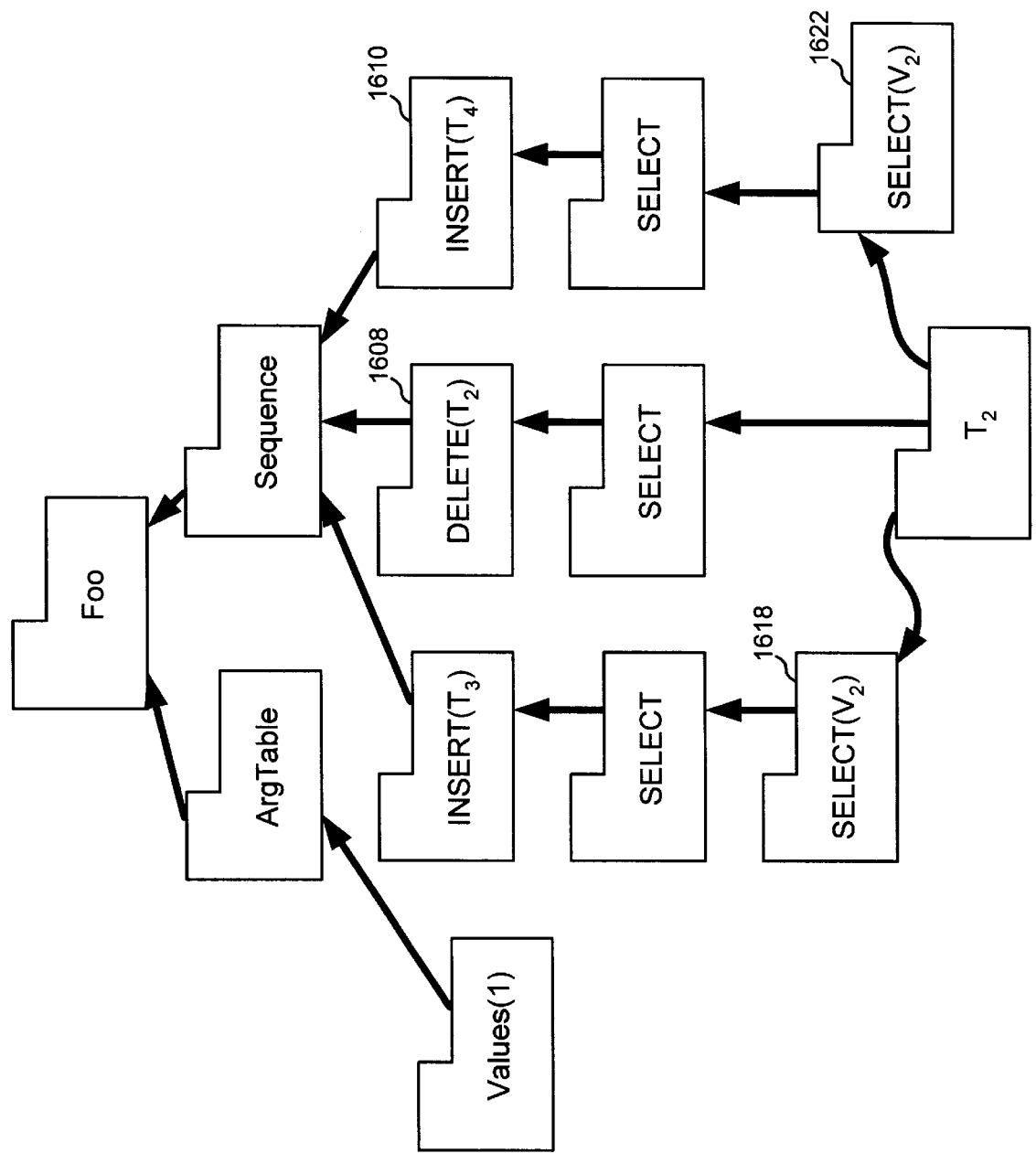
FIG. 16 illustrates the query graph model generated by the intelligent compiler component corresponding to the compiled SQL statements after the splitting of a common subexpression.

FIG. 16 illustrates the query graph model generated by the intelligent compiler component 100 corresponding to the compiled SQL statements for the above example after the splitting of the common subexpression 1518, shown in FIG. 15. Both SELECT box 1618 and SELECT box 1622 compute the results of view $V_2$. However, since the views are not common, the INSERT box 1610 into table $T_4$ reflects the modification of the DELETE box 1608. All other boxes are identical in functionality to the boxes of the query graph model illustrated in FIG. 15.

Figure 17:
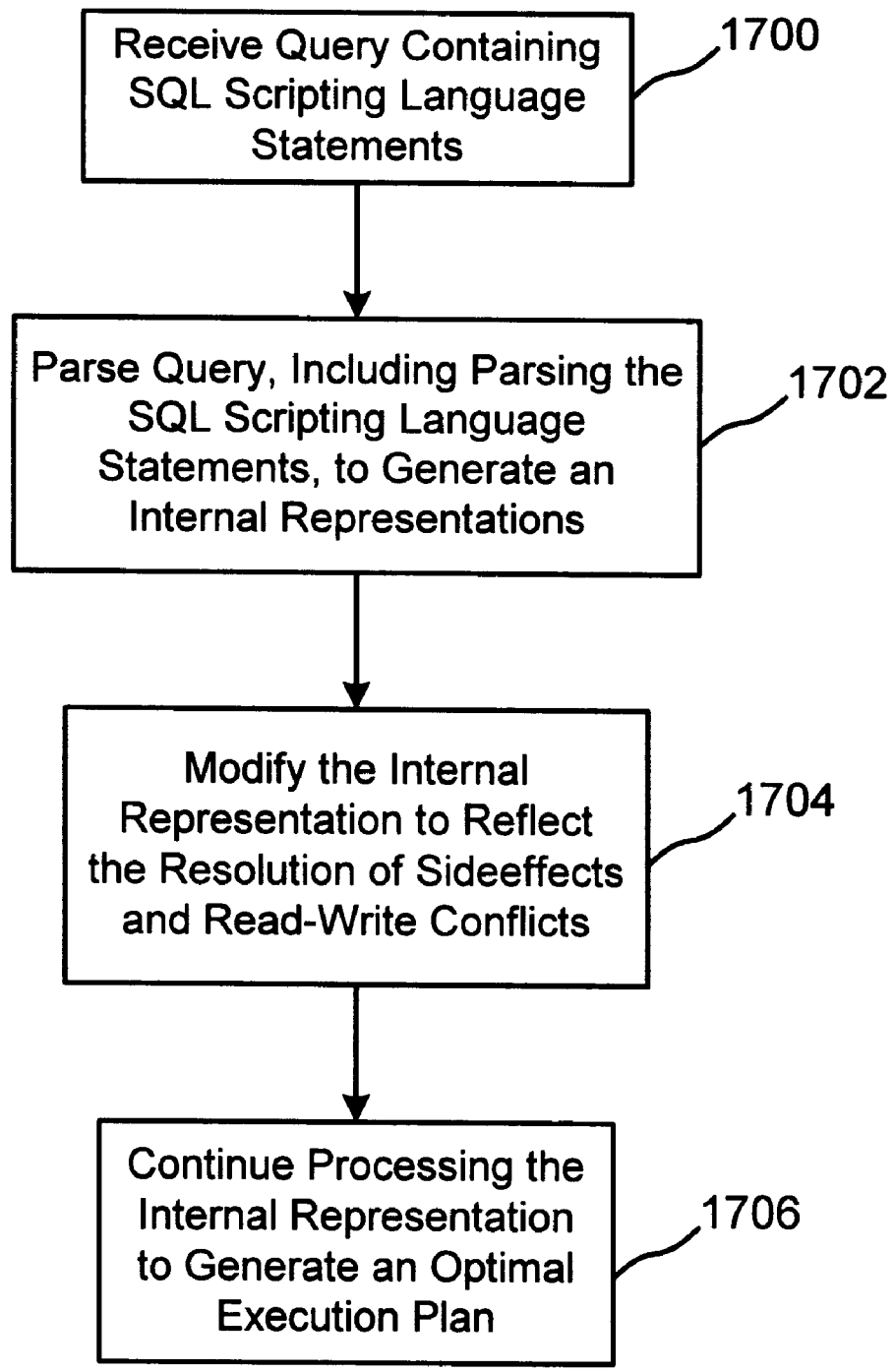
FIG. 17 is a flow diagram illustrating the steps performed by the intelligent compiler component upon receiving a query containing SQL scripting language statements.

FIG. 17 is a flow diagram illustrating the steps performed by the intelligent compiler component 100 upon receiving a query containing SQL scripting language statements. In Block 1700, the intelligent compiler component 100 receives a query containing SQL scripting language statements. In block 1702, the intelligent compiler component 100, in conjunction with the parser 102, parses the query to generate an internal representation of the query. In particular, the intelligent compiler component 100 parses the SQL scripting language statements. In Block 1704, the intelligent compiler component 100 modifies the query graph model to reflect the resolution of sideeffects and read-write conflicts that require shallow correlation, deep correlation, and/or view splitting. In Block 1706, the intelligent compiler component 100 continues processing the internal representation to generate an optimal execution plan.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for an intelligent compiler. The present invention provides optimized execution of SQL scripting language statements. The present invention also compiles SQL scripting language statements to generate internal representations that are used in optimizing the execution of the query.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a query in a computer to retrieve data from a relational database stored on a data storage device, comprising the steps of:

compilation of the query, which contains one or more scripting language statements, to generate an internal representation;

compilation of the scripting language statements to modify the generated internal representation to reflect the parsing of the scripting language statements, wherein each scripting language statement specifies syntax and semantics of a database language for declaring and maintaining persistent database language routines; and optimization of the execution of the scripting language statements using the modified internal representation.

2. The method of claim 1 above, further comprising the step of compiling a sequence.

3. The method of claim 1 above, further comprising the step of compiling a local variable declaration.

4. The method of claim 1 above, further comprising the step of compiling a local variable set statement.

5. A method of executing a query in a computer to retrieve data from a relational database stored on a data storage device, comprising the steps of:

compilation of one or more scripting language statements to generate an internal representation, further comprising the step of compiling a return in a sequence; and optimizing the execution of the scripting language statements using the generated internal representation.

6. A method of executing a query in a computer to retrieve data from a relational database stored on a data storage device, comprising the steps of:

compilation of one or more scripting language statements to generate an internal representation, further comprising the step of compiling an early exit in a sequence; and optimizing the execution of the scripting language statements using the generated internal representation.

7. A method of executing a query in a computer to retrieve data from a relational database stored on a data storage device, comprising the steps of:

compilation of one or more scripting language statements to generate an internal representation, further comprising the step of compiling an iterative sequence; and optimizing the execution of the scripting language statements using the generated internal representation.

8. The method of claim 1 above, further comprising the step of compiling a sequence that returns a table.

9. The method of claim 1 above, further comprising the step of compiling a case statement.

10. The method of claim 9 above, further comprising the step of processing each selection of the case statement.

11. The method of claim 1 above, wherein the step of compiling further comprises the step of performing shallow correlation.

12. The method of claim 1 above, wherein the step of compiling further comprises the step of performing deep correlation.

13. The method of claim 1 above, wherein the step of compiling further comprises the step of splitting a common subexpression.

14. The method of claim 13 above, wherein a result of splitting the subexpression is an expression.

15. An apparatus for executing a query, comprising:
   a computer having a memory and a data storage device coupled thereto, wherein the data storage device stores a relational database; and
   one or more computer programs, performed by the computer, for compiling the query, which contains one or more scripting language statements, to generate an internal representation, for compiling the scripting language statements to modify the generated internal representation to reflect the parsing of the scripting language statements, wherein each scripting language statement specifies syntax and semantics of a database language for declaring and maintaining persistent database language routines, and for optimizing the execution of the scripting language statements using the modified internal representation.

16. The apparatus of claim 15 above, further comprising the means for compiling a sequence.

17. The apparatus of claim 15 above, further comprising the means for compiling a local variable declaration.

18. The apparatus of claim 15 above, further comprising the means for compiling a local variable set statement.

19. An apparatus for executing a query, comprising:
   a computer having a memory and a data storage device coupled thereto, wherein the data storage device stores a relational database; and
   one or more computer programs, performed by the computer, for compiling one or more scripting language statements to generate an internal representation, further comprising the means for compiling a return in a sequence, and for optimizing the execution of the scripting language statements using the generated internal representation.

20. An apparatus for executing a query, comprising:
   a computer having a memory and a data storage device coupled thereto, wherein the data storage device stores a relational database; and
   one or more computer programs, performed by the computer, for compiling one or more scripting language statements to generate an internal representation, further comprising the means for compiling an early exit in a sequence, and for optimizing the execution of the scripting language statements using the generated internal representation.

21. An apparatus for executing a query, comprising:
   a computer having a memory and a data storage device coupled thereto, wherein the data storage device stores a relational database; and
   one or more computer programs, performed by the computer, for compiling one or more scripting language statements to generate an internal representation, further comprising the means for compiling an iterative sequence, and for optimizing the execution of the scripting language statements using the generated internal representation.

22. The apparatus of claim 15 above, further comprising the means for compiling a sequence that return a table.

23. The apparatus of claim 15 above, further comprising the means for compiling a case statement.

24. The apparatus of claim 23 above, further comprising the means for processing each selection of the case statement.

25. The apparatus of claim 15 above, wherein the means for compiling further comprises the means for performing shallow correlation.

26. The apparatus of claim 15 above, wherein the means for compiling further comprises the means for performing deep correlation.

27. The apparatus of claim 15 above, wherein the means for compiling further comprises the means for splitting common subexpressions.

28. The apparatus of claim 27 above, wherein a result of splitting the subexpression is an expression.

29. An article of manufacture comprising a program storage medium readable by a computer and embodying one or more instructions executable by the computer to perform method steps for executing a query to retrieve data from a relational database stored on a data storage device, the method comprising the steps of:
   compilation of the query, which contains one or more scripting language statements, to generate an internal representation;
   compilation of the scripting language statements to modify the generated internal representation to reflect the parsing of the scripting language statements, wherein each scripting language statement specifies syntax and semantics of a database language for declaring and maintaining persistent database language routines; and
   optimization of the execution of the scripting language statements using the modified internal representation.

30. The method of claim 29 above, further comprising the step of compiling a sequence.

31. The method of claim 29 above, further comprising the step of compiling a local variable declaration.

32. The method of claim 29 above, further comprising the step of compiling a local variable set statement.

33. An article of manufacture comprising a program storage medium readable by a computer and embodying one or more instructions executable by the computer to perform method steps for executing a query to retrieve data from a relational database stored on a data storage device, the method comprising the steps of:
   compilation of one or more scripting language statements to generate an internal representation, further comprising the step of compiling a return in a sequence; and
   optimizing the execution of the scripting language statements using the generated internal representation.

34. An article of manufacture comprising a program storage medium readable by a computer and embodying one or more instructions executable by the computer to perform method steps for executing a query to retrieve data from a relational database stored on a data storage device, the method comprising the steps of:
   compilation of one or more scripting language statements to generate an internal representation, further comprising the step of compiling an early exit in a sequence; and optimizing the execution of the scripting language statements using the generated internal representation.

35. An article of manufacture comprising a program storage medium readable by a computer and embodying one or more instructions executable by the computer to perform method steps for executing a query to retrieve data from a relational database stored on a data storage device, the method comprising the steps of:

compilation of one or more scripting language statements to generate an internal representation, further comprising the step of compiling an iterative sequence; and optimizing the execution of the scripting language statements using the generated internal representation.

36. The method of claim 29 above, further comprising the step of compiling a sequence that return a table.

37. The method of claim 29 above, further comprising the step of compiling a case statement.

38. The method of claim 37 above, further comprising the step of processing each selection of the case statement.

39. The method of claim 29 above, wherein the step of compiling further comprises the step of performing shallow correlation.

40. The method of claim 29 above, wherein the step of compiling further comprises the step of performing deep correlation.

41. The method of claim 29 above, wherein the step of compiling further comprises the step of splitting common subexpressions.

42. The method of claim 41 above, wherein a result of splitting the subexpression is an expression.

* * * * *